United States Patent
Tokuyama et al.

(10) Patent No.: US 12,057,627 B1
(45) Date of Patent: Aug. 6, 2024

(54) ANTENNA MEMBER

(71) Applicant: ASAHI KASEI KABUSHIKI KAISHA, Tokyo (JP)

(72) Inventors: Miki Tokuyama, Tokyo (JP); Masahito Kuramitsu, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/580,812

(22) PCT Filed: Aug. 2, 2022

(86) PCT No.: PCT/JP2022/029690
§ 371 (c)(1),
(2) Date: Jan. 19, 2024

(87) PCT Pub. No.: WO2023/013650
PCT Pub. Date: Feb. 9, 2023

(30) Foreign Application Priority Data

Aug. 5, 2021 (JP) ................................ 2021-129182

(51) Int. Cl.
*H01Q 1/24* (2006.01)
*H01Q 1/02* (2006.01)
*H01Q 1/36* (2006.01)

(52) U.S. Cl.
CPC .................. *H01Q 1/36* (2013.01); *H01Q 1/02* (2013.01); *H01Q 1/246* (2013.01)

(58) Field of Classification Search
CPC ............ H01Q 1/36; H01Q 1/02; H01Q 1/246; H01Q 1/243
See application file for complete search history.

(56) References Cited

U.S. PATENT DOCUMENTS

| 2,513,188 A | 6/1950 | Macallum |
| 3,257,357 A | 6/1966 | Stamatoff |

(Continued)

FOREIGN PATENT DOCUMENTS

| CN | 113099608 A | 7/2021 |
| EP | 3758139 A1 | 12/2020 |

(Continued)

OTHER PUBLICATIONS

Feb. 6, 2024, International Preliminary Report on Patentability issued in the International Patent Application No. PCT/JP2022/029690.

(Continued)

*Primary Examiner* — Awat M Salih
(74) *Attorney, Agent, or Firm* — KENJA IP LAW PC

(57) ABSTRACT

The thermoplastic resin composition includes a polyphenylene ether resin, and the deflection temperature under load of the thermoplastic resin composition is 120° C. or higher, and when a temperature range while the thermoplastic resin composition is heated from −30° C. to 120° C. is divided into temperature ranges with intervals of 10° C., and a low temperature side and a high temperature side of respective two adjacent temperature ranges are defined as a low temperature range and a high temperature range, respectively, a low temperature range expansion coefficient of the resin composition in a TD direction (mm/mm/° C.) and a high temperature range expansion coefficient of the resin composition in the TD direction (mm/mm/° C.) satisfy the following relationship in any of the two adjacent temperature ranges: −50≤((high temperature range expansion coefficient−low temperature range expansion coefficient)/low temperature range expansion coefficient)×100≤50.

14 Claims, 1 Drawing Sheet

(56) References Cited

U.S. PATENT DOCUMENTS

| | | | |
|---|---|---|---|
| 3,257,358 | A | 6/1966 | Stamatoff |
| 3,274,165 | A | 9/1966 | Lenz et al. |
| 3,306,874 | A | 2/1967 | Hay |
| 3,306,875 | A | 2/1967 | Hay |
| 3,919,177 | A | 11/1975 | Campbell |
| 3,929,930 | A | 12/1975 | Izawa et al. |
| 4,011,200 | A | 3/1977 | Yonemitsu et al. |
| 5,449,722 | A * | 9/1995 | Nishida .................. C08L 101/00 524/451 |
| 5,760,746 | A | 6/1998 | Kawahata |
| 8,445,570 | B2 * | 5/2013 | Sakata .................... C08L 67/02 524/195 |
| 2006/0211800 | A1 | 9/2006 | Itakura et al. |
| 2007/0026223 | A1 * | 2/2007 | Osada .................. H01M 50/133 428/480 |
| 2007/0072963 | A1 * | 3/2007 | Shibayama .......... H05K 1/0373 524/80 |
| 2011/0121947 | A1 | 5/2011 | Kubota et al. |
| 2015/0166788 | A1 | 6/2015 | Li et al. |
| 2015/0281859 | A1 | 10/2015 | Fischer et al. |
| 2017/0111077 | A1 * | 4/2017 | Hwang ................ H05K 5/0247 |
| 2017/0190909 | A1 | 7/2017 | Saegusa |
| 2017/0346195 | A1 | 11/2017 | Yamamoto et al. |
| 2018/0323514 | A1 | 11/2018 | Pance et al. |
| 2022/0021100 | A1 | 1/2022 | Hiramatsu et al. |
| 2022/0380538 | A1 | 12/2022 | Nosaka et al. |

FOREIGN PATENT DOCUMENTS

| | | |
|---|---|---|
| GB | 1213678 A | 11/1970 |
| JP | S453368 B1 | 2/1970 |
| JP | S4627255 B1 | 8/1971 |
| JP | S5051197 A | 5/1975 |
| JP | S5212240 B2 | 4/1977 |
| JP | S5217880 B2 | 5/1977 |
| JP | S61225217 A | 10/1986 |
| JP | S63152628 A | 6/1988 |
| JP | H05222196 A | 8/1993 |
| JP | H06279602 A | 10/1994 |
| JP | H07228689 A | 8/1995 |
| JP | H08253587 A | 10/1996 |
| JP | H0998015 A | 4/1997 |
| JP | H1045936 A | 2/1998 |
| JP | 2992667 B2 | 12/1999 |
| JP | 2002271130 A | 9/2002 |
| JP | 2002324966 A | 11/2002 |
| JP | 2003115645 A | 4/2003 |
| JP | 3930814 B2 | 6/2007 |
| JP | 2009249515 A | 10/2009 |
| JP | 2016195191 A | 11/2016 |
| KR | 1020080002777 A | 1/2008 |
| KR | 1020110063436 A | 6/2011 |
| KR | 1020130038508 A | 4/2013 |
| WO | 2016024531 A1 | 2/2016 |
| WO | 2019026963 A1 | 2/2019 |
| WO | 2020096036 A1 | 5/2020 |
| WO | 2021065964 A1 | 4/2021 |

OTHER PUBLICATIONS

Oct. 25, 2022, International Search Report issued in the International Patent Application No. PCT/JP2022/029690.

Oct. 25, 2022, Written Opinion of the International Searching Authority issued in the International Patent Application No. PCT/JP2022/029690.

* cited by examiner

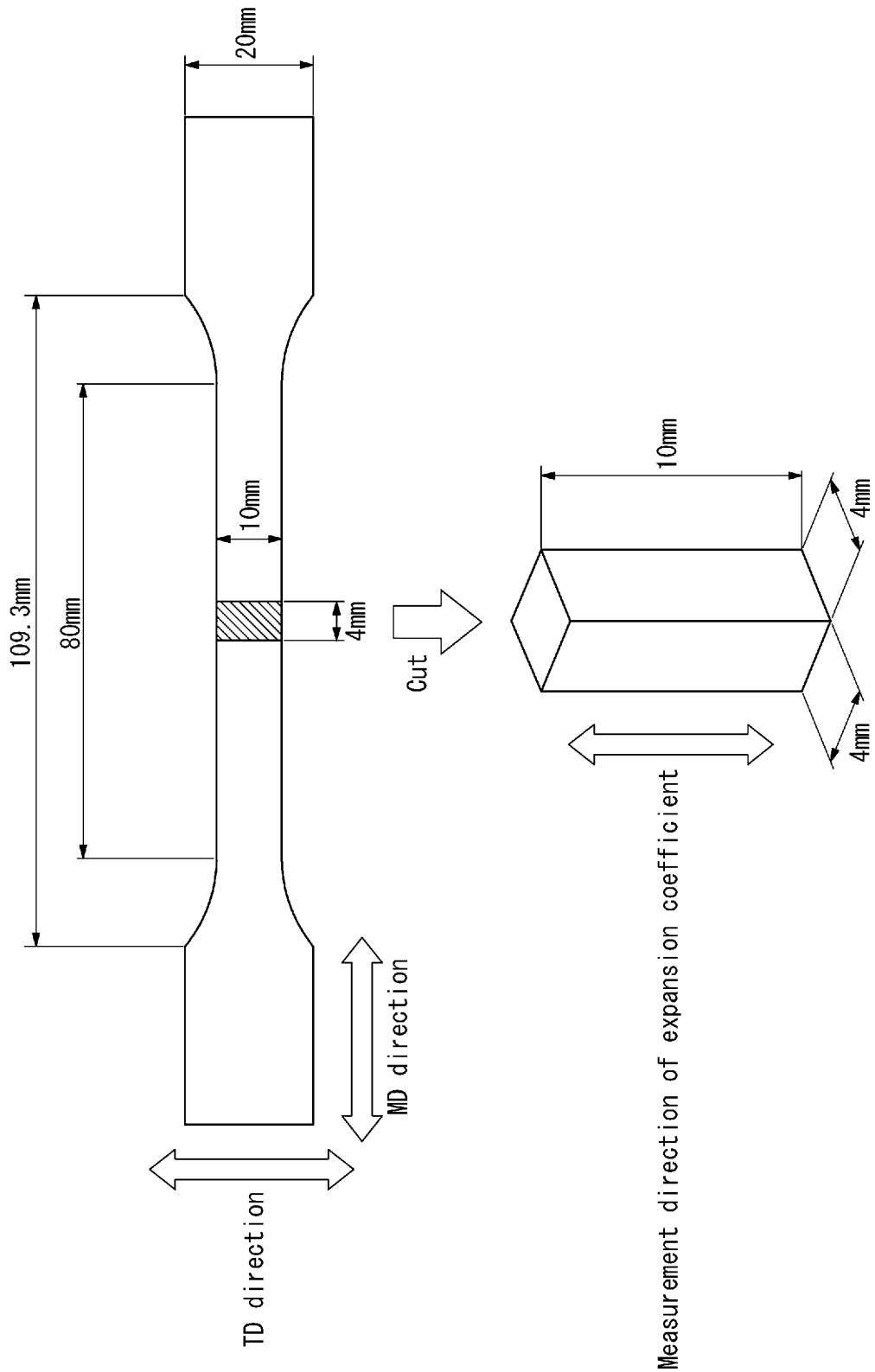

ANTENNA MEMBER

TECHNICAL FIELD

The present disclosure relates to an antenna member.

BACKGROUND

Conventionally, metals and ceramics have been used for antenna members in large amounts in view of mechanical properties and heat resistance. Weight reduction is required, however, in view of ease of installation and handling during assembly, especially for base stations for telecommunications apparatuses, and there is a demand for products made of resins.

For example, filters are made of a metal or ceramic, and a lot of surfaces should be covered with a metal for filtering radio waves. When a resin is used in place of a metal, that resin needs to be capable of being coated by means of plating or sputtering. In addition, in order for an antenna element (pendulum) in a telecommunication apparatus to exhibit performances as an antenna, a metal circuit is laid on a resin that has a low dielectric dissipation factor.

In the meantime, surface-mounted dielectric antennas for mobile communication apparatuses such as cellular phones and wireless LAN devices have been proposed which are made of a dielectric ceramic alone, a resin alone, or a resin composition containing ceramics. For example, a surface-mounted dielectric antenna in which the antenna base is made of a ceramic alone or a resin alone (see PTL 1), and a foam made of a styrene-based resin having a syndiotactic structure with the real part of the relative permittivity of about 18 and having good palatability and a manufacturing method thereof (see PTL 2) are disclosed. Furthermore, a resin composition in which spherical dielectric ceramic powders are mixed with a resin material at a ratio of 40 vol % to 70 vol % (% by volume) in a composition (see PTL 3), and a composite material in which titanic acid metal salt fibers an aspect of which is adjusted to a ratio of 3 to 5 to obtain high filling is composited with a thermoplastic resin, etc. (see PTL 4) are disclosed.

CITATION LIST

Patent Literature

PTL 1: JP H09-98015 A
PTL 2: JP H10-45936 A
PTL 3: JP 3930814 B
PTL 4: JP 2992667 B

SUMMARY

Technical Problem

When resin compositions are used for antenna members such as those described above, excellent mechanical and electrical properties and heat resistance, as well as excellent dimensional stability, are required. In addition, from the viewpoint of ease of molding into desired shapes, antenna members are required to be molded by injection molding. Furthermore, materials that can be coated with metals by plating or sputtering and of which metal coating does not peel off at high temperatures are required. Specifically, since all parts emit heat during communications, the resin per se is required to have heat resistance, and the dimensions thereof are required to remain unchanged in high-temperature regions, and the metal coating is required not to peel off. Antennas are exposed to the external environment and the internal temperature may rise because they contain internal components that generate heat. Antenna characteristics are required to be exhibited even at high temperatures, and materials with low dielectric constant and low dielectric dissipation factor are required even at high temperatures. In addition, resins that permit formation of circuits thereon are also required, and from the viewpoint of forming circuits, materials that can exhibit antenna characteristics in the high-frequency band of 1 GHz or higher and maintain a low dielectric dissipation factor in the high-temperature range are also required.

Furthermore, in recent years, with the spread of 5G communications, there is a growing demand for base stations that support 5G communications. As communication speeds increase, the heat generated by base stations is increasing, and the weight of heat sinks provided to dissipate the heat are very high, which increases the overall weight, and there is thus a growing demand for weight reduction. In particular, antenna filters are made of a metal or ceramic and occupy a considerable weight in the base station. Although resin-made antenna filters make it possible to reduce weight and simplify the process steps, it requires the formation of a metal coating, and there are issues with maintaining adhesion between the resin and a metal. In addition, because the circuit is required to be formed from a metal for a pendulum of an antenna, not only adhesion between a resin and the metal is required but also a material with a low dielectric dissipation factor is required so that antenna performances are exhibited. With such advancement of communication technologies, handling information at all frequencies, from low to high frequencies, is required.

In addition, with the recent trend toward wide-area communications, antenna members are required to maintain the various characteristics described above while also being able to exhibit these performances in a low temperature, high temperature, or high humidity environment.

Therefore, an object of the present disclosure is to provide an antenna member that can be molded by injection molding and adaptable to any environment, including a low temperature, high temperature, or high humidity environment, with little dimensional change and little change in dielectric dissipation factor in a high temperature region while maintaining adhesion with a metal coating.

Solution to Problem

The prevent inventor has diligently examined the aforementioned problem and has discovered that by using a certain resin composition for an antenna component, it is possible to maintain antenna performances in any environment while contributing to weigh reduction and simplification of assembly steps for communication apparatuses, thereby completing the present disclosure.

Specifically, the present disclosure is as follows.

[1]

An antenna member comprising an injection molded body made of a thermoplastic resin composition, and a metal coating on at least a portion of the injection molded body,
  wherein the thermoplastic resin composition contains
    (A-a) a polyphenylene ether-based resin,
  a deflection temperature under load (DTUL) of the thermoplastic resin composition is 120° C. or higher, and
  when a temperature range while the thermoplastic resin composition is heated from −30° C. to 120° C. is divided into temperature ranges with intervals of 10°

C., and a low temperature side and a high temperature side of respective two adjacent temperature ranges are defined as a low temperature range and a high temperature range, respectively, a low temperature range expansion coefficient of the resin composition in a TD direction (mm/mm/° C.) and a high temperature range expansion coefficient of the resin composition in the TD direction (mm/mm/° C.), as measured by the method described in ISO 11359, satisfy the following relationship in any of the two adjacent temperature ranges:

−50≤((high temperature range expansion coefficient−low temperature range expansion coefficient)/low temperature range expansion coefficient)×100≤50.

[2]

The antenna member according to [1], wherein a temperature dependence of a dielectric dissipation factor of the thermoplastic resin composition at 28 GHz satisfies the following condition:
1. when the DTUL is 120° C. or higher and lower than 140° C., a difference between a value of the dielectric dissipation factor at 23° C. and the value of the dielectric dissipation factor at 120° C. is 0.004 or less, or
2. when the DTUL is 140° C. or higher, the difference between the value of the dielectric dissipation factor at 23° C. and the value of the dielectric dissipation factor at 140° C. is 0.004 or less.

[3]

The antenna member according to [1] or [2], wherein, when the temperature range while the thermoplastic resin composition is heated from −30° C. to 120° C. is divided into temperature ranges with intervals of 10° C., an average value of the expansion coefficients in the temperature ranges of the resin composition in the TD direction, measured in accordance with ISO 11359 is $10 \times 10^{-5}$ mm/mm/° C. or less.

[4]

The antenna member according to [3], wherein, when the temperature range while the thermoplastic resin composition is heated from −30° C. to 120° C. is divided into temperature ranges with intervals of 10° C., a maximum value of the expansion coefficients in the temperature ranges of the resin composition in the TD direction, measured in accordance with ISO 11359 is $10 \times 10^{-5}$ or less.

[5]

The antenna member according to any one of [1] to [4], wherein the (A) thermoplastic resin comprises (A-b) a crystalline resin.

[6]

The antenna member according to any one of [1] to [5], wherein the thermoplastic resin composition comprises 10 mass % or more of (B) an inorganic filler.

[7]

The antenna member according to any one of [1] to [6], wherein the (A) thermoplastic resin comprises 10 mass % or more of (A-a) a polyphenylene ether-based resin.

[8]

The antenna member according to any one of [1] to [7], used for an outdoor or indoor antenna base station.

[9]

The antenna member according to any one of [1] to [8], wherein the metal coating is formed by chromic acid etching electroless copper plating.

[10]

The antenna member according to any one of [1] to [9], wherein no crack is generated in the metal layer after the antenna member is allowed to stand at 85° C. and a humidity of 85% for 2000 h after the metal coating is formed by the chromic acid etching electroless copper plating.

[11]

The antenna member according to any one of [1] to [10], wherein the thermoplastic resin composition further comprises (A-c-a) a polystyrene-based resin.

[12]

The antenna member according to any one of [1] to [11], wherein the resin composition comprises (A-c-b) a block copolymer containing at least one block mainly composed of an aromatic vinyl monomer unit and at least one block mainly composed of a conjugated diene monomer unit, and/or a hydrogenated product of the block copolymer.

[13]

The antenna member according to any one of [1] to [12], being an antenna filter.

[14]

The electrolysis system according to any one of [1] to [12], being an antenna element.

Advantageous Effect

According to the present disclosure, it is possible to obtain an antenna member that can be molded by injection molding and adaptable to any environment, including a low temperature, high temperature, or high humidity environment, with little dimensional change and little change in dielectric dissipation factor in a high temperature region while maintaining adhesion with a metal coating.

BRIEF DESCRIPTION OF THE DRAWINGS

FIG. 1 is a diagram illustrating the method to cut out a specimen from an evaluation ISO dumbbell to measure the rate of expansion in the example.

DETAILED DESCRIPTION

The following provides a detailed description of the presently disclosed matter.

An antenna member of the present embodiment includes an injection molded body made of a thermoplastic resin composition, and a metal coating on at least a portion of the injection molded body, wherein the thermoplastic resin composition contains (A-a) a polyphenylene ether-based resin, a deflection temperature under load (DTUL) of the thermoplastic resin composition is 120° C. or higher, and when a temperature range while the thermoplastic resin composition is heated from −30° C. to 120° C. is divided into temperature ranges with intervals of 10° C., and a low temperature side and a high temperature side of respective two adjacent temperature ranges are defined as a low temperature range and a high temperature range, respectively, a low temperature range expansion coefficient of the resin composition in a TD direction (mm/mm/° C.) and a high temperature range expansion coefficient of the resin composition in the TD direction (mm/mm/° C.), as measured by the method described in ISO 11359, satisfy the following relationship in any of the two adjacent temperature ranges:

−50≤((high temperature range expansion coefficient−low temperature range expansion coefficient)/low temperature range expansion coefficient)×100≤50.

The following is a detailed description of each component of the thermoplastic resin composition in the present embodiment.

[(A) Thermoplastic Resin]

In the present embodiment, the (A) thermoplastic resin refers to a resin component excluding fillers, inorganic fillers, and the like. Examples of such a resin component include various resins used for molding, such as polyphenylene ether-based resins, polyester-based resins, polyamide-based resins, polycarbonate-based resins, vinyl-based resins, olefin-based resins, acrylic resins, and aromatic resins.

Because the (A) thermoplastic resin of the present embodiment includes (A-a) a polyphenylene ether-based resin, the adhesion to the metal coating and the temperature dependence of the dielectric dissipation factor are improved.

The (A) thermoplastic resin of the present embodiment can also include resin components primarily for improving the impact resistance, such as olefinic thermoplastic elastomers and hydrogenated block copolymers.

The (A) thermoplastic resin of the present embodiment may also contain (A-b) a crystalline resin or other thermoplastic resins, such as polyester-based resins, polyamide-based resins, polycarbonate-based resins, vinyl-based resins, olefin-based resins, acrylic resins, and aromatic-based resins.

Olefin-based resins are suitably used in view of low dielectric dissipation factor, and resins with sufficient heat resistance are more preferred, such as polyester resins such as polyethylene naphthalate (PEN), polyethylene terephthalate (PET), polybutylene terephthalate (PBT); and polyolefin polymers such as cyclic olefin polymer (COP), cyclo-olefin copolymers, and methylpentene polymer (TPX), for example.

Examples of the above olefinic thermoplastic elastomers include polyolefin homopolymers such as polyethylene and polypropylene; and polyolefin copolymers such as ethylene-propylene copolymer, ethylene-butylene copolymer, and ethylene-octene copolymer. In particular, high-pressure low-density polyethylene (LDPE), linear low-density polyethylene (LLDPE), and high-density polyethylene (HDPE) are examples of polyethylene homopolymers.

In addition, examples of the above hydrogenated block copolymers include hydrogenated block copolymers obtained by hydrogenating block copolymers consisting of a polystyrene block and a conjugated diene compound polymer block.

The structure of the block copolymer before hydrogenation is not particularly limited. For example, the structures S—B—S, SB—S—B, (S—B—)$_4$-S, S—B—S—B—S, and other structures are used where S represents a polystyrene block chain and B represents a conjugated diene compound polymer block chain.

[(A-a) Polyphenylene Ether-Based Resin]

Specific examples of the (A-a) polyphenylene ether-based resin (hereinafter, simply referred to as "(A-a) component" in the present embodiment include poly (2,6-dimethyl-1,4-phenylene ether), poly (2-methyl-6-ethyl-1,4-phenylene ether), poly (2-methyl-6-phenyl-1,4-phenylene ether), poly (2,6-dichloro-1,4-phenylene ether), and polyphenylene ether copolymers such as a copolymer of 2,6-dimethylphenol and other phenols (for example, a copolymer with 2,3,6-trimethylphenol or a copolymer with 2-methyl-6-butylphenol as described in JP S52-17880 B).

Among these, polyphenylene ethers such as poly (2,6-dimethyl-1,4-phenylene ether), a copolymer of 2,6-dimethylphenol and 2,3,6-trimethylphenol, or a mixture of these are particularly preferred.

The above (A-a) component may, for example, be a homopolymer composed of a repeating unit structure represented by the following formula (1) or a copolymer including a repeating unit structure represented by the following formula (1).

The above (A-a) component may be used alone or in a combination of two or more.

[Chem. 1]

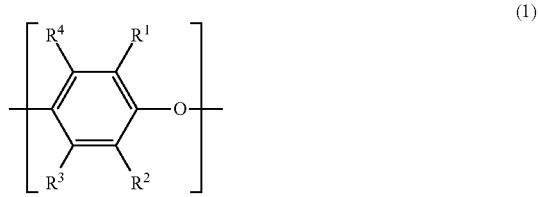

In formula (1), $R^1$, $R^2$, $R^3$, and $R^4$ are each, independently of one another, a monovalent group selected from the group consisting of a hydrogen atom, a halogen atom, a primary alkyl group having a carbon number of 1 to 7, a secondary alkyl group having a carbon number of 1 to 7, a phenyl group, a haloalkyl group, an aminoalkyl group, a hydrocarbonoxy group, and a halohydrocarbonoxy group in which a halogen atom and an oxygen atom are separated by at least two carbon atoms.

The (A-a) polyphenylene ether-based resin can be produced by a commonly known method without any specific limitations. For example, it can be produced by a method described in U.S. Pat. No. 3,306,874 A in which production is performed through oxidative polymerization of 2,6-xylenol, for example, using a complex of a cuprous salt and an amine as a catalyst, or a production method described in any of U.S. Pat. Nos. 3,306,875 A, 3,257,357 A, 3,257,358 A, JP S50-51197 A, JP S52-17880 B, and JP S63-152628 A.

The range of the reduced viscosity (measured with 0.5-g/dL chloroform solution at 30° C. using an Ubbelohde-type viscometer) of the (A-a) polyphenylene ether-based resin in the present embodiment is preferably 0.30 to 0.80 dL/g, more preferably 0.35 to 0.75 dL/g, and most preferably 0.38 to 0.55 dL/g. When the reduced viscosity of the (A-a) polyphenylene ether-based resin is within this range, excellent properties such as impact resistance and heat resistance can be obtained, which is preferable.

Note that a blend of two or more polyphenylene ethers having different reduced viscosities can also preferably be used in the (A-a) polyphenylene ether-based resin of the present embodiment.

Further, various known stabilizers can also be preferably used to stabilize the (A-a) polyphenylene ether-based resin. Examples of the stabilizer include metal-based stabilizers such as zinc oxide and zinc sulfide, and organic stabilizers such as hindered phenol-based stabilizers, phosphorus-based stabilizers, and hindered amine-based stabilizers. These stabilizers are preferably blended in an amount of less than 5 parts by mass with respect to 100 parts by mass of the (A-a) polyphenylene ether-based resin.

Furthermore, a known additive or the like, which can be added to the (A-a) polyphenylene ether-based resin, may also be added in an amount of less than 10 parts by mass with respect to 100 parts by mass of the (A-a) polyphenylene ether-based resin.

The (A-a) component may be modified polyphenylene ether that is obtained by reacting a styrene-based monomer or derivative thereof and/or an α,β-unsaturated carboxylic acid or derivative thereof with a homopolymer and/or copolymer such as described above. The grafted amount or added amount of the styrene monomer or derivative thereof and/or the α,β-unsaturated carboxylic acid or derivative thereof is preferably 0.01 mass % to 10 mass % relative to 100 mass % of the (A-a) component.

The method by which the modified polyphenylene ether is produced may, for example, be a method in which a reaction is carried out under a temperature of 80 to 350° C. in a molten state, solution state, or slurry state, and in the presence or absence of a radical precursor.

The polyphenylene ether that is used may be a mixture of a homopolymer and/or copolymer such as described above and modified PPE such as described above in any ratio.

When (A-b) a crystalline resin to be described below is not included, from the viewpoint of enabling control of dielectric constant while maintaining heat resistance and a low dielectric dissipation factor, the content of the (A-a) polyphenylene ether-based resin per 100 mass % of the (A) thermoplastic resin is preferably 50 mass % or more, preferably 55 mass % or more, and more preferably 60 mass % or more. From the viewpoint of the moldability, it is preferably 85 mass % or less.

When the (A-b) crystalline resin to be described below is included, from the viewpoint of enabling control of the dielectric constant while maintaining heat resistance and a low dielectric dissipation factor, the content of the (A-a) polyphenylene ether-based resin per 100 mass % of the (A) thermoplastic resin is preferably 5 mass % or more, preferably 10 mass % or more, and more preferably 15 mass % or more. From the viewpoint of the moldability, it is preferably 90 mass % or less.

In particular, from the viewpoint of maintaining a low dielectric dissipation factor in the high temperature range, the amount of the (A-a) polyphenylene ether-based resin is 5 parts by mass or more, more preferably 10 parts by mass or more, and even more preferably 15 parts by mass or more, when the total amount of the (A-a) polyphenylene ether-based resin and the (A-b) crystalline resin is taken as 100 parts by mass. From the viewpoint of the moldability, it is preferably 90 parts by mass or less.

[(A-b) Crystalline Resin]

The present embodiment may also include (A-b) a crystalline resin. (A-b-a) a polyamide, (A-b-b) a polypropylene, and (A-b-c) a polyphenylene sulfide resin are suitably used. In addition, other crystalline resins such as polyethylene, polyacetal, polyethylene terephthalate, polybutylene terephthalate, polyetheretherketone, liquid crystal polymers, and polytetrafluoroethylene can also be used.

The specific amount of each (A-b) crystalline resin added is preferably 90 mass % or less, more preferably 80 mass % or less, and even more preferably 85 mass % or less when the amount of the entire thermoplastic resin composition is taken to be 100 mass %.

In particular, from the viewpoint of maintaining a low dielectric dissipation factor in the high temperature range, the amount of the (A-b) crystalline resin is 95 mass % or less, more preferably, 90 mass % or less, and even more preferably 85 mass % or less, when the total amount of the (A-a) polyphenylene ether-based resin and the (A-b) crystalline resin is taken to be 100 mass %.

[(A-b-a) Polyamide]

The (A-b-a) polyamide (hereinafter, also referred to simply as the "(A-b-a) component") of the present embodiment is not specifically limited so long as it includes an amide bond {—NH—C(=O)-} in a repeating unit of a polymer main chain.

Polyamides are generally obtained through ring-opening polymerization of lactams, polycondensation of a diamine and a dicarboxylic acid, polycondensation of an ω-aminocarboxylic acid, or the like. However, no limitation is made to resins obtained by these methods.

The lactams may, more specifically, be ε-caprolactam, enatholactam, ω-laurolactam, or the like.

The diamine may be broadly classified as an aliphatic diamine, an alicyclic diamine, or an aromatic diamine. Specific examples of the diamine include aliphatic diamines such as tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,9-nonanediamine, 2-methyl-1,8-octanediamine, ethylenediamine, propylenediamine, 1,4-butanediamine, 1,6-hexanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine, and 5-methyl-1,9-nonanediamine, 1,3-bisaminomethylcyclohexane, 1,4-bisaminomethylcyclohexane, m-phenylenediamine, p-phenylenediamine, m-xylylenediamine, and p-xylylenediamine.

The dicarboxylic acid may be broadly classified as an aliphatic dicarboxylic acid, an alicyclic dicarboxylic acid, or an aromatic dicarboxylic acid. Specific examples of the dicarboxylic acid include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalenedicarboxylic acid, and dimer acids.

In addition, the aminocarboxylic acid may, more specifically, be 8-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, or the like.

In the present embodiment, any copolymerized polyamide obtained by polycondensation of one or a mixture of two or more of these lactams, diamines, dicarboxylic acids, and ω-aminocarboxylic acids may be used.

Moreover, it is also possible to suitably use a product that is obtained by polymerizing any of these lactams, diamines, dicarboxylic acids, and ω-aminocarboxylic acids in a polymerization reactor until a low molecular weight oligomer stage is reached and then carrying out polymerization to reach a high molecular weight in an extruder or the like.

In particular, examples of the (A-b-a) polyamide that can suitably be used in the present embodiment include polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylenediamine),6, polyamide 6,T, polyamide 9,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, and polyamide 6,6/12/6,I.

Furthermore, a polyamide obtained by copolymerizing a plurality of polyamides among those described above in an extruder or the like can also be used. Of the polyamides described above, one or more polyamides selected from aliphatic polyamides among polyamide 6, polyamide 6,6, polyamide 4,6, polyamide 11, and polyamide 12; and semi-aromatic polyamides among polyamide 9,T, polyamide 6/6,T, polyamide 6,6/6,T, polyamide 6,6/6,I, and polyamide MXD,6 are preferable, and one or more polyamides selected from polyamide 6,6, polyamide 6, polyamide 9,T, and polyamide 6,6/6,I are more preferable.

The (A-b-a) polyamide according to the present embodiment is preferably one including a dicarboxylic acid unit (a) containing a terephthalic acid unit in 60 to 100 mol %, and a diamine unit (b) containing an aliphatic diamine unit having a carbon number of 9 to 12 in 60 to 100 mol %, in view of water absorption and heat resistance.

[[Dicarboxylic Acid Unit (a)]]

The dicarboxylic acid unit (a) in the present embodiment contains the terephthalic acid unit in 60 to 100 mol %, preferably 70 to 100 mol %, more preferably 80 to 100 mol %, even more preferably 90 to 100 mol %, and still even more preferably 100 mol %, in the unit (a). When the molar ratio is within any of these ranges, a resin composition excellent in heat resistance can be obtained. In addition, an excellent high cycle moldability is achieved upon molding of a molded body having a complex shape or a large molded body.

The dicarboxylic acid unit (a) may contain a dicarboxylic acid unit other than the terephthalic acid unit. Examples of such a dicarboxylic acid unit include, but are not limited to, units derived from aliphatic dicarboxylic acids such as malonic acid, dimethylmalonic acid, succinic acid, glutaric acid, adipic acid, 2-methyladipic acid, trimethyl adipic acid, pimelic acid, 2,2-dimethylglutaric acid, 3,3-diethylsuccinic acid, azelaic acid, sebacic acid, and sebellic acid; alicyclic dicarboxylic acids such as 1,3-cyclopentane dicarboxylic acid and 1,4-cyclohexane dicarboxylic acid; and aromatic dicarboxylic acids such as isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, diphenic acid, 4,4'-oxydibenzoic acid, diphenylmethane-4,4'-dicarboxylic acid, diphenyl sulfone-4,4'-dicarboxylic acid, and 4,4'-biphenyl dicarboxylic acid, for example.

These units may be used alone or in a combination of two or more.

The amount of the dicarboxylic acid unit other than the terephthalic acid unit in the dicarboxylic acid unit (a) may be in a range of 40 mol % or less, and is more preferably 30 mol % or less, even more preferably 20 mol % or less, still even more preferably in a range of 10 mol % or less, and most preferably 0 mol %.

[[Diamine Unit (b)]]

The diamine unit (b) in the present embodiment contains an aliphatic diamine unit having a carbon number of 9 to 12 in 60 to 100 mol %, preferably 70 to 100 mol %, more preferably 80 to 100 mol %, even more preferably 90 to 100 mol %, and still even more preferably 100 mol %. When the carbon number and the molar ratio of diamine unit are within any of the above ranges, a resin composition having an excellent balance between the low water absorption property and the heat resistance is obtained.

The diamine unit (b) may be linear or branched.

Example of the linear aliphatic diamine forming the diamine unit (b) include, but is not limited to, 1,9-nonane diamine (also referred to as nonamethylene diamine), decamethylene diamine, undecamethylene diamine, and dodecamethylene diamine.

Examples of the aliphatic diamine forming the aliphatic diamine unit having a substituent branched from the main chain for forming the diamine unit (b) include, but are not limited to, 2,2,4-trimethyl hexamethylene diamine, 2,4,4-trimethyl hexamethylene diamine, 2-methyl-1,8-octane diamine (also referred to as 2-methyl-octamethylene diamine), and 2,4-dimethyl-octamethylene diamine.

The diamine unit (b) preferably includes a 1,9-nonane diamine unit and/or a 2-methyl-1,8-octane diamine unit from the viewpoint of balancing the mechanical strength, the low water absorption property, and the heat resistance. Among these, using a combination of a 1,9-nonane diamine unit and a 2-methyl-1,8-octane diamine unit is preferred.

When the diamine unit (b) includes a 1,9-nonane diamine unit and/or a 2-methyl-1,8-octane diamine unit, the molar ratio of the 1,9-nonane diamine unit to the 2-methyl-1,8-octane diamine unit (1,9-nonane diamine unit/2-methyl-1,8-octane diamine unit) is preferably from 100/0 to 20/80. The molar ratio is more preferably from 95/5 to 60/40, and even more preferably from 90/10 to 75/25. When the molar ratio is within any of these ranges, a resin composition having particularly an excellent heat resistance tends to be provided.

The diamine unit (b) may contain a diamine unit other than the aliphatic diamine unit having a carbon number of 9 to 12. Example of such a diamine unit include, but are not limited to, units derived from aliphatic diamines such as ethylene diamine, propylene diamine, tetramethylene diamine, pentamethylene diamine, hexamethylene diamine, heptamethylene diamine, octamethylene diamine, and 2-methylpentamethylene diamine (also referred to as 2-methyl-1,5-diaminopentane); alicyclic diamines such as 1,4-cyclohexane diamine, 1,3-cyclohexane diamine, and 1,3-cyclopentane diamine; and aromatic diamines such as meta-xylene diamin.

These units may be used alone or in a combination of two or more.

The amount of the diamine unit other than the aliphatic diamine unit having a carbon number of 9 to 12 may be in a range of 40 mol % or less, and is more preferably in a range of 30 mol % or less, even more preferably in a range of 20 mol % or less, still even more preferably in a range of 10 mol % or less, and most preferably 0 mol %, in the dicarboxylic acid unit (ba).

Preferred examples of the (A-b-a) polyamide in the present embodiment include Polyamide 9,T and Polyamide 10,T.

In addition, the (A-b-a) polyamide of the present embodiment contains a lactam unit such as a unit of butyrolactam, pivalolactam, ε-caprolactam, caprolactam, enatholactam, and undecanolactam; an aminocarboxylic acid unit such as a unit of 6-aminocaproic acid, 11-aminoundecanoic acid, and 12-aminododecanoic acid; a trivalent or higher polyvalent amine unit such as a unit of bishexamethylene triamine; and a trivalent or higher polyvalent carboxylic acid unit such as a unit of trimellitic acid, trimethinic acid, and pyromellitic acid, to the extent that an object of the present embodiment is not impaired.

These units may be used alone or in a combination of two or more.

The ratio (mol %) of the sum of such units in the (A-b-a) polyamide is preferably 20 mol % or less, more preferably 10 mol % or less, and even more preferably 5 mol % or less.

[Content of (A-b-a) Polyamide]

In the thermoplastic resin composition of the present embodiment, when the content of the (A) thermoplastic resin is taken as 100 mass %, the content of the (A-b-a) component is preferably from 25 to 75 mass %, more preferably from 30 to 75 mass %, and even more preferably from 30 to 70 mass %. When the content of the (A-b-a) component is within any of these ranges, a resin excellent in mechanical strength, low water absorption property, dimensional accuracy, and weld strength can be obtained.

Further, in the thermoplastic resin composition of the present embodiment, when the sum of the component (A-a)

and the component (A-b-a) is taken as 100 mass %, the content of the component (A-b-a) is from 50 to 95 mass %, preferably from 60 to 95 mass %, and even more preferably from 60 to 90 mass %. When the content of component (A-b-a) is within any of these range, the thermoplastic resin composition has excellent mechanical strength, low water absorption, dimensional accuracy, and weld strength, and high cycle molding is possible.

[Production Method of (A-b-a) Polyamide]

The production method of the (A-b-a) polyamide is not particularly limited, and the following methods are exemplified, for example.

1) a method in which aqueous solutions or water suspensions of the dicarboxylic acid and the diamine, or an aqueous solution or water suspension of a mixture of the dicarboxylic acid and the diamine and an optional component such as a lactam and/or an aminocarboxylic acid (hereinafter, these may be simply referred to as "mixture thereof") are heated while a molten state is maintained to cause polymerization to take place (hereinafter referred to as the "thermal melt polymerization method");

2) a method in which aqueous solution(s) or water suspension(s) of the dicarboxylic acid and the diamine or a mixture thereof are heated, and a precipitated prepolymer is then extracted ("prepolymer method");

3) a method in which a polyamide obtained through the thermal melt polymerization method is maintained in the solid state at a temperature equal to or lower than the melting point to increase the degree of polymerization of the polyamide ("thermal melt polymerization-solid phase polymerization method");

4) a method in which aqueous solution(s) or water suspension(s) of the dicarboxylic acid and the diamine or a mixture thereof are heated, and a precipitated prepolymer is molten again in an extruder such as a kneader to increase the degree of polymerization thereof ("prepolymer-extrusion polymerization method");

5) a method in which aqueous solution(s) or water suspension(s) of the dicarboxylic acid and the diamine or a mixture thereof are heated, and the prepolymer is maintained in the solid state at a temperature equal to or lower than the melting point of the polyamide to increase the degree of polymerization of a precipitated prepolymer ("prepolymer-solid phase polymerization method");

6) a method in which the dicarboxylic acid and the diamine or a mixture thereof are caused to be polymerized while the solid state is maintained ("monomer-solid phase polymerization method");

7) a method in which "salts of the dicarboxylic acid and the diamine" or a mixture thereof are caused to be polymerized while the solid state is maintained ("salt/solid phase polymerization method"); and 8) a method in which polymerization is taken place using a dicarboxylic acid halide equivalent to a dicarboxylic acid and the diamine ("solution method").

The form of the polymerization in the production method of the (A-b-a) polyamide is not particularly limited, and batch and continuous polymerization are exemplified, for example.

A polymerization apparatus is not particularly limited, and any well-known apparatus (e.g., an autoclave type reactor, a tumbler type reactor, an extruder type reactor such as a kneader, for example) may be used.

[Physical Properties of (A-b-a) Polyamide]

The end groups of the (A-b-a) polyamide in the thermoplastic resin composition of the present embodiment are involved in the reaction with the (A-a) polyphenylene ether-based resin. Generally, a polyamide-based resin has amino groups or carboxyl groups as end groups. In general, as the end carboxyl group concentration increases, the impact resistance tends to be decreased and the flowability tends to be increased. Further, in general, as the end amino group concentration increases, the impact resistance tends to be increased and the flowability tends to be decreased. Nevertheless, the physical properties of the thermoplastic resin composition of the present embodiment are not restricted to the above-described tendencies.

The end amino group concentration in the component (A-b-a) is preferably from 1 to 80 μmol, more preferably from 5 to 60 μmol/g, even more preferably from 10 to 45 μmol/g, and still even more preferably from 20 to 40 μmol/g. Setting the end amino group concentrations within any of the above ranges helps to maintain the balance between the flowability and the impact resistance of the thermoplastic resin composition of the present embodiment, at an even higher level.

The end carboxyl group concentration in the component (A-b-a) is preferably from 20 to 150 μmol/g, and more preferably from 30 to 130 μmol/g. Setting the end carboxyl group concentrations within any of the above ranges helps to maintain the balance between the flowability and the impact resistance of the thermoplastic resin composition of the present embodiment, at an even higher level.

The respective end group concentrations of the polyamides can be adjusted using well-known methods. For example, one example is a method in which one or more selected from diamine compounds, monoamine compounds, dicarboxylic acid compounds, monocarboxylic acid compounds, and the like are added during polymerization of the polyamide such that certain end group concentrations are achieved.

The end amino group concentration and the end carboxyl group concentration can be measured by various methods. For example, using $^1$H-NMR to determine the concentrations from integral values of the corresponding characteristic signals is preferred from the viewpoint of the accuracy and simplicity. A specific example of a method for quantifying the end group concentrations in a polyamide resin is the method described in JP H07-22869 A, for example. Specifically, the numbers of the respective end groups are preferably determined by $^1$H-NMR (500 MHz, measured at 50° C. in deuterated trifluoroacetic acid) to determine the integral values of the characteristic signals corresponding to the end groups, from the viewpoint of the accuracy and simplicity. In the case where the characteristic signal of ends capped by an end-capping agent cannot be identified, the limiting viscosity [η] of a polyamide is measured and the total number of end groups in the molecular chain is calculated from the relationship in the following equation.

$$Mn = 21900\ [\eta] - 7900\ (Mn\ \text{represents the number average molecular weight})\ \text{Total number of end groups in molecular chain (eq/g)} = 2/Mn$$

In the (A-b-a) polyamide, 10 to 95% of the end groups in the molecular chain are preferably capped by an end-capping agent. The lower limit of the ratio of the capped end groups in the molecular chain of the polyamide (end capped ratio) is more preferably 40% or more, and even more preferably 60% or more. Setting the end capped ratio equal to or higher than any of the above lower limits prevents the viscosity from being increased during molding of the thermoplastic resin composition of the present embodiment. In addition, the upper limit of the end capped ratio is preferably 95% or less, and more preferably 90% or less. Setting the end capped ratio equal to or lower than any of the above upper limits further improves the impact resistance and the surface appearance of a molded body.

The end capped ratio of a polyamide can be determined according to the following formula (1) by measuring the respective numbers of end carboxyl groups, end amino groups, and end groups capped by an end-capping agent in the polyamide.

$$\text{End capped ratio (\%)} = [(\alpha - \beta)/\alpha \times 100] \quad (1)$$

(In the formula, $\alpha$ is the total number of end groups in the molecular chain (in moles; this is usually equal to twice the number of polyamide molecules) and $\beta$ is the total number of uncapped carboxyl end groups and amino end groups remained (in moles)).

There is no particular limitation on an end-capping agent as long as it is a monofunctional compound having reactivity with the amino group or carboxyl group at ends of a polyamide. However, a monocarboxylic acid and a monoamine are preferred from the viewpoint of the reactivity and the stability of capped ends, and a monocarboxylic acid is more preferred from the viewpoint of ease of handling. Other than these, acid anhydrides, monoisocyanates, mono acid halides, monoesters, mono alcohols, and the like can be used as the end-capping agent.

The monocarboxylic acid used as the end-capping agent is not limited as long as it has reactivity with amino groups, and examples thereof include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and any mixtures of these, for example. Among these, acetic acid, propionic acid, butyric acid, valeric acid, caproic acid, caprylic acid, lauric acid, tridecanoic acid, myristic acid, palmitic acid, stearic acid, and benzoic acid are preferred and acetic acid and benzoic acid are more preferred, from the viewpoints of the reactivity, the stability of capped ends, and the economic efficiency.

The monoamine used as the end-capping agent is not particularly limited to as long as it has reactivity with carboxyl groups, and examples thereof include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; any mixture thereof, for example. Among these, butylamine, hexylamine, octylamine, decylamine, stearylamine, cyclohexylamine, and aniline are preferred and butylamine, hexylamine and octylamine are more preferred, from the viewpoints of the reactivity, the boiling point, the stability of capped ends, and the economic efficiency.

For the purpose of further improving the heat stability of the resin composition, a transition metal and/or halogen may be included in the thermoplastic resin composition as well as in the polyamide.

The transition metal is not particularly limited, and examples thereof include iron, copper, cerium, nickel, and cobalt, for example. Among these, copper is preferred from the viewpoint of the long-term thermal stability. The halogen is not particularly limited, but bromine and iodine are preferred from the viewpoint of preventing corrosion of production facilities or the like.

The content of the transition metal is preferably 1 ppm or more and less than 200 ppm by mass, and more preferably 5 ppm or more and less than 100 ppm on the mass basis when the sum of the component (A-a) and the component (A-b-a) of the present embodiment is taken as 100 parts by mass. Further, the content of the halogen is preferably 500 ppm or more and less than 1500 ppm by mass, and more preferably 700 ppm or more and less than 1200 ppm on the mass basis when the sum of the component (A-a) and the component (A-b-a) of the present embodiment is taken as 100 parts by mass.

The method of adding such transition metal and/or halogen to the resin composition is not particularly limited, and examples thereof include, for example, the method of adding them in powders in the step of melt-kneading the polyamides and (A-a); the method of adding them during polymerization of a polyamide; and the method of producing master pellets of a polyamide containing the transition metal and/or halogen in a high concentration, followed by adding the master pellets to the resin composition. Among these methods, preferred are the method of adding them during polymerization of a polyamide; and the method of producing master pellets of a polyamide containing the transition metal and/or halogen with a high concentration, followed by adding the master pellets to the resin composition.

Besides the transition metal and/or halogen described above, commonly known organic stabilizers can also be used without any issues in the present embodiment.

Examples of organic stabilizers that may be used include hindered phenol-based antioxidants, representative examples of which include Irganox 1098 (produced by Ciba Specialty Chemicals), phosphorus-based processing heat stabilizers, representative examples of which include Irgafos 168 (produced by Ciba Specialty Chemicals), lactone-based processing heat stabilizers, representative examples of which include HP-136 (produced by Ciba Specialty Chemicals), sulfur-based heat resistance stabilizers, and hindered amine-based light stabilizers. Of these organic stabilizers, a hindered phenol-based antioxidant, a phosphorus-based processing heat stabilizer, or a combination thereof is more preferable.

The preferred amount of these organic stabilizers is 0.001 parts by mass to 1 part by mass relative to 100 parts by mass of the (A-b-a) polyamide.

[(A-b-b) Polypropylene-Based Resin]

The (A-b-b) polypropylene-based resin may be, but is not specifically limited to, a homopolymer or copolymer having propylene as a repeating unit structure. A crystalline propylene homopolymer, a crystalline propylene-ethylene block copolymer, or a mixture of a crystalline propylene homopolymer and a crystalline propylene-ethylene block copolymer is preferable.

The crystalline propylene-ethylene block copolymer is not particularly limited, and examples thereof include those having a crystalline propylene homopolymer moiety and a propylene-ethylene random copolymer moiety.

From the viewpoint of suppressing drawdown during combustion and improving the balance between fluidity and mechanical strength of the resin composition, the melt mass flow rate (hereinafter, also referred to as "MFR") of the (A-b-b) component is preferably 0.1 g/10 min or higher, more preferably 0.3 g/10 min or higher, and particularly preferably 0.5 g/10 min or higher. The MFR is preferably 15 g/10 min or lower, more preferably 6 g/10 min or lower, and particularly preferably 3 g/10 min or lower.

The MFR can be measured under conditions of a temperature of 230° C. and a load of 2.16 kg according to ISO1133. Specifically, the MFR can be measured with the method described in the EXAMPLES section below.

A method of producing the (A-b-b) component is not particularly limited, and a known method may be used. Specific examples of the method of producing the propylene include a method of polymerizing propylene under conditions of a temperature of 0° C. to 100° C. and a pressure of 3 atm to 100 atm in the presence of a polymerization catalyst composition containing a titanium trichloride catalyst or a titanium halide catalyst etc. supported on a carrier such as magnesium chloride etc. and an aluminum alkyl compound. In the method, a chain transfer agent such as hydrogen may be added to adjust the molecular weight of the polymer.

In the method, the polymerization system can further include an electron donating compound as an internal donor component or an external donor component in addition to the above-described polymerization catalyst composition, so that the isotacticity of the obtained polypropylene and the polymerization activity of the polymerization system can be enhanced. These electron donating compounds are not particularly limited, and known ones may be used. Specific examples of the electron donating compound include ester compounds such as ε-caprolactone, methyl methacrylate, ethyl benzoate, and methyl toluate; phosphite esters such as triphenyl phosphite and tributyl phosphite; phosphoric acid derivatives such as hexamethylphosphorictriamide; alkoxy ester compounds; aromatic monocarboxylic acid esters; aromatic alkylalkoxysilanes; aliphatic hydrocarbon alkoxysilanes; various ether compounds; various alcohols; and various phenols.

In the method, the polymerization manner may be either a batch manner or a continuous manner, and the polymerization method may be a solution polymerization method or a slurry polymerization method using a solvent such as butane, pentane, hexane, heptane and octane, or a bulk polymerization method in a monomer or a gas phase polymerization method in a gaseous polymer without solvent, or the like.

Among the methods of producing the (A-b-b) component, a method of producing the crystalline propylene-ethylene block copolymer is not particularly limited. Examples thereof include a method including a first step of obtaining a crystalline propylene homopolymer moiety, and a second step of obtaining a propylene-ethylene block copolymer moiety bonded to the crystalline propylene homopolymer moiety by copolymerizing the crystalline propylene homopolymer moiety with ethylene and other α-olefin added as necessary. As used herein, the other α-olefin is not particularly limited, and examples thereof include propylene, 1-butene, and 1-hexene.

In the above-described polypropylene-based resin, a known modified polyolefin-based resin may be used, where the modified polyolefin-based resin is obtained by reacting a polyolefin-based resin with an α,β-unsaturated carboxylic acid or a derivative thereof (where the α,β-unsaturated carboxylic acid or a derivative thereof is grafted or added by 0.01 weight % to 10 weight %) in the presence or absence of radical generator in a molten or solution state at a temperature of 30° C. to 350° C., or a mixture in which the above-described polypropylene-based resin and the modified polyolefin-based resin are mixed in an arbitrary ratio may be used.

Reasons for using a modified polyolefin-based resin include improved adhesion at the interface between the resin and a filler (filler). The addition of modified polyolefin improves adhesion at the interface between the resin and a filler and increases strength.

[Ratio Between Content of (A-a) a Polyphenylene Ether-Based Resin and Content of (b) Polypropylene]

In the present embodiment, a ratio between the content of the (A-a) component and the content of the (A-b-b) component is preferably as follows: the content of the (A-a) component is 10 parts by mass to 70 parts by mass and the content of the (A-b-b) component is 30 parts by mass to 90 parts by mass with the total amount of the (A-a) component and the (A-b-b) component being 100 parts by mass. It is more preferably that the content of the (A-a) component be 10 parts by mass to 60 parts by mass and the content of the (A-b-b) component be 40 parts by mass to 90 parts by mass. It is still more preferably that the content of the (A-a) component be in a range of 10 parts by mass to 50 parts by mass and the content of the (A-b-b) component be in a range of 50 parts by mass to 90 parts by mass. When the ratio between the content of the (A-a) component and the content of the (A-b-b) component is in these ranges, the balance between impact resistance, heat resistance and tensile strength is excellent, which is preferable.

These ratios in the resin composition can be determined with a calibration curve method using Fourier transform infrared spectroscopy (FT-IR).

[(A-b-c) Polyphenylene Sulfide Resin]

The (A-b-c) polyphenylene sulfide resin used in the present embodiment may be classified into two types according to the production method thereof: linear polyphenylene sulfide resin (hereinafter sometimes referred to as linear PPS) and crosslinked polyphenylene sulfide resin (hereinafter sometimes referred to as crosslinked PPS).

[[Linear PPS]]

The former linear PPS is a polymer containing typically 50 mol % or more, preferably 70 mol % or more, and even more preferably 90 mol % or more of an arylene sulfide repeating unit represented by the following chemical formula (1):

(where Ar represents an arylene group, and examples of the arylene group include, for example, p-phenylene group, m-phenylene group, substituted phenylene groups (the substituent is preferably an alkyl group having carbon number of 1 to 10 or a phenyl group), p,p'-diphenylene sulfone group, p,p'-biphenylene group, a p,p'-diphenylene carbonyl group, and naphthylene group).

The linear PPS may be a homopolymer including one type of arylene group as the constituent unit, or may be a copolymer produced by mixing two or more different arylene groups from the viewpoints of the processability and the heat resistance. Among these, a linear PPS having a repeating unit of p-phenylene sulfide as the main constituent is preferred because of its excellent processability and heat resistance as well as industrial availability.

The production method of this linear PPS usually includes, for example, a method by polymerization of a halogenated aromatic compound (e.g., p-dichlorobenzene) in the presence of sulfur and sodium carbonate; a method by polymerization in the presence of sodium sulfide or sodium hydrogen sulfide and sodium hydroxide in a polar solvents or in the presence of hydrogen sulfide and sodium hydroxide or sodium aminoalkanoate; and self-condensation of p-chlorothiophenol. Among these, preferred is a method in which sodium sulfide and p-dichlorobenzene are reacted in an amide-based solvent such as N-methylpyrrolidone or dimethylacetamide or a sulfone-based solvent such as sulfolane.

These production methods are well known, and the linear PPS can be obtained by the methods described in, for example, U.S. Pat. No. 2,513,188 B, JP 544-27671 B, JP S45-3368 B, JP S52-12240 B, JP S61-225217 A, U.S. Pat. No. 3,274,165 B, as well as JP S46-27255 A, BE 29437 B, JP H5-222196 A, and prior art methods exemplified in these documents, and the like.

A preferred linear PPS has an extraction amount by methylene chloride of 0.7 mass % or less, preferably 0.5 mass % or less, and a terminal —SX group (where S is a sulfur atom and X is an alkali metal or a hydrogen atom) of 20 µmol/g or more, preferably 20 to 60 µmol/g.

Here, the extraction amount by methylene chloride can be determined by the following method.

Specifically, 5 g of linear PPS powder is added to 80 mL of methylene chloride, and Soxhlet extraction is performed for 6 hours. Then, after being cooled to room temperature, the extracted methylene chloride solution is transferred to a weighing bottle. The vessel used in the extraction is washed three times with 60 mL of methylene chloride in total, and the liquid used for washing is collected in the weighing bottle. Then, the weighing bottle is heated to about 80° C. to evaporate methylene chloride in the weighing bottle, and the residue is weighed. The extraction amount by methylene chloride, i.e., the proportion of amount of oligomer in the linear PPS is determined from the weight of the residue.

In addition, the —SX group can be quantified by the following method. Specifically, linear PPS powder is dried at 120° C. for 4 hours. Thereafter, 20 g of the dried linear PPS powder is added to 150 g of N-methyl-2-pyrrolidone, and is stirred vigorously at room temperature for 30 minutes such that powder aggregate is eliminated to form a slurry state. The slurry is filtrated, and the residue is then washed with 1 liter of warm water at 80° C. The washing was repeated 7 times. After the resultant filter cake is slurrified with 200 g of pure water again, the pH of the slurry is then adjusted to 4.5 by adding 1-N hydrochloric acid.

Then, after being stirred for 30 minutes at 25° C., the slurry is filtrated and washed with 1 L of warm water at 80° C. for each washing. The washing was repeated 6 times. The resultant filter cake is slurrified with 200 g of pure water again, and is titrated with a 1-N sodium hydroxide solution. The amount of —SX group in the linear PPS is determined from the amount of sodium hydroxide consumed.

Here, a specific example of the production method of linear PPS satisfying the extraction amount by methylene chloride of 0.7 mass % or less and the terminal —SX group of 20 µmol/g or more is the method described in JP H8-253587 A in which the amount of oligomer components are reduced by reacting an alkali metal sulfide with a dihaloaromatic compound in an organoamide-based solvent, and condensing a portion of the gas phase in the reaction vessel by cooling the gas phase portion of the reaction vessel during the reaction and refluxing it back into the liquid layer above the reaction solution.

[[Cross-Linked PPS]]

The crosslinked (including semi-crosslinked) polyphenylene sulfide resin is produced by, after producing the above-described linear PPS by polymerization, carrying out thermal treatment in the presence of oxygen at a temperature equal to or lower than the melting point of the polyphenylene sulfide resin to promote oxidative crosslinking to thereby suitably increase the polymer molecular weight and the viscosity.

The most preferred cross-linked PPS among such cross-linked PPSs is cross-linked PPS with a volatile content of 1000 mass ppm or less collected in a molten state of 320° C. in view of gas and tar generation and mold release properties when the resin composition obtained in the present disclosure is molded. Here, the volatile content collected in the molten state of 320° C. can be quantified by the following method.

Specifically, 0.5 g of crosslinked PPS powder is weighed into a tightly sealed test tube with an airflow inlet and outlet, nitrogen gas is introduced from the airflow inlet of the test tube at a flow rate of 100 cc/min while test tube was immersed in a solder bath heated to 320° C. for 30 minutes, and gas containing volatile contents derived from crosslinked PPS in the test tube is purged from the airflow outlet of the test tube. The purged gas is bubbled into acetone in a tightly sealed test tube with an airflow inlet and outlet filled with the acetone through the airflow inlet to dissolve volatile components into acetone. The volatile content of crosslinked PPS dissolved in acetone can be determined by using a gas chromatograph-mass spectrometer (GC-MS) to quantify all components detected by temperature rise analysis from 50° C. to 290° C., assuming that they had the same sensitivity as monochlorobenzene.

To obtain crosslinked PPS with a volatile content of 1000 mass ppm or less collected in the melted state of 320° C., usually, the polymer concentration or the solvent composition in the polymerization stage of linear PPS is adjusted, the washing method to collect the polymer in the polymerization stage is adjusted, or the temperature or the time of high-temperature treatment in the subsequent crosslinking stage is changed, etc. In this way, cross-linked PPS with a desired volatile content can be obtained.

[[Acid Modified PPS]]

Such PPSs (linear PPS and crosslinked PPS) may be acid-modified PPSs. An acid-modified PPS is produced by modifying a PPS as described above with an acid compound. Examples of the acid compound include unsaturated carboxylic acids such as acrylic acid, methacrylic acid, maleic acid, fumaric acid, maleic anhydride, and anhydrides thereof, saturated aliphatic carboxylic acids, and substituted aromatic carboxylic acids. Furthermore, inorganic compound-based acid compounds such as acetic acid, hydrochloric acid, sulfuric acid, phosphoric acid, silicic acid, and carbonic acid can also be exemplified as the acid compound.

[[Melt Viscosity of PPS]]

The melt viscosity of each of the linear PPS and cross-linked PPS described above at 300° C. is 1 to 10000 Pa·s, preferably 50 to 8000 Pa·s, more preferably 100 to 5000 Pa·s.

In this specification, the melt viscosity refers to the value measured using a flow tester (type CFT-500 manufactured by Shimadzu Corporation) under a load of 196 N, with die length (L)/die diameter (D) of 10 mm/i mm using JIS K-7210 as a reference test method, after PPS is preheated to 300° C. for 6 minutes.

[(A-c) Amorphous Thermoplastic Resin Other than Polyphenylene Ether]

[[(A-c-a) Polystyrene-Based Resin]]

The (A) matrix resin of the present embodiment may include polystyrene-based resin. Examples of the polystyrene-based resin include an atactic polystyrene, a rubber-reinforced polystyrene (high impact polystyrene, HIPS), a styrene-acrylonitrile copolymer (SAN) having a styrene content of 50 weight % or more, and an ABS resin in which such a styrene-acrylonitrile copolymer is reinforced with a rubber, and the atactic polystyrene and/or the high impact polystyrene are preferable.

One type of polystyrene-based resin may be used individually, or two or more types of polystyrene-based resins may be used in combination. Note that the above-described polystyrene-based resins do not include (A-c-d) a styrene-glycidyl methacrylate copolymer to be described below.

The preferred content of the (A-c-a) polystyrene-based resin in the present embodiment is 0 to 100 parts by mass, more preferably 0 to 90 parts by mass, and more preferably 0 to 80 parts by mass when the content of the (A-a) polyphenylene ether-based resin is taken to be 100 parts by mass.

[[(A-c-b) Block Copolymer Containing at Least One Block Mainly Composed of Aromatic Vinyl Monomer Unit and at Least One Block Mainly Composed of Conjugated Diene Monomer Unit, and/or Hydrogenated Product of the Block Copolymer]]

In the present embodiment, (A-c-b) a block copolymer containing at least one block mainly composed of an aromatic vinyl monomer unit and at least one block mainly composed of a conjugated diene monomer unit, and/or a hydrogenated product of the block copolymer (hereinafter, simply referred to as "(A-c-b) component") may be further included, and is preferably included. The (A-c-b) block copolymer containing at least one block mainly composed of an aromatic vinyl monomer unit and at least one block mainly composed of a conjugated diene monomer unit and/or the hydrogenated product of the block copolymer in the present embodiment refers to a non-hydrogenated block copolymer containing at least one aromatic vinyl polymer block mainly composed of an aromatic vinyl monomer unit and at least one conjugated diene polymer block mainly composed of a conjugated diene monomer unit, and/or a hydrogenated product of the block copolymer.

Note that "mainly of aromatic vinyl monomer units" in relation to the above aromatic vinyl polymer block means that aromatic vinyl monomer units constitute 50 mass % or more of the block. Aromatic vinyl monomer units more preferably constitute 70 mass % or more, even more preferably 80 mass % or more, and most preferably 90 mass % or more.

Likewise, "mainly of conjugated diene monomer units" in relation to the conjugated diene polymer block means that conjugated diene monomer units constitute 50 mass % or more of the block. Conjugated diene monomer units more preferably constitute 70 mass % or more, even more preferably 80 mass % or more, and most preferably 90 mass % or more.

Moreover, the aromatic vinyl polymer block may, for example, be a copolymer block having a small amount of a conjugated diene compound bonded at random in an aromatic vinyl polymer block. Likewise, the conjugated diene polymer block may, for example, be a copolymer block having a small amount of an aromatic vinyl compound bonded at random in a conjugated diene polymer block.

Examples of aromatic vinyl compounds that may be used to form aromatic vinyl monomer units include, but are not specifically limited to, styrene, α-methylstyrene, and vinyltoluene. One or more compounds selected from these aromatic vinyl compounds may be used, of which, styrene is particularly preferable.

Examples of conjugated diene compounds that may be used to form the conjugated diene polymer block include, but are not specifically limited to, butadiene, isoprene, piperylene, and 1,3-pentadiene. One or more compounds selected from these conjugated diene compounds may be used, of which, butadiene, isoprene, and combinations thereof are preferable.

The microstructure of the conjugated diene polymer block portion of the above block copolymer has a 1,2-vinyl amount or a sum of the 1,2-vinyl amount and the 3,4-vinyl amount (total vinyl bond amount) of preferably 5 to 85%, more preferably 10 to 80%.

Note that the total vinyl bond content can be measured using an infrared spectrophotometer.

The non-hydrogenated block copolymer used in production of a hydrogenated product of the above block copolymer (hydrogenated block copolymer) is preferably a block copolymer having a bonding form of the aromatic vinyl polymer block (A) and the conjugated diene polymer block (B) selected from an A-B type, an A-B-A type, and an A-B-A-B type. Moreover, a combination of block copolymers having different bonding structures among those listed above may be used. Among these, possession of a bonding form selected from A-B-A and A-B-A-B types is more preferred, and a bonding form having an A-B-A type is even more preferred.

Furthermore, the (A-c-b) component used in the present embodiment is preferably a partially hydrogenated block copolymer (partially hydrogenated block copolymer).

The term "partially hydrogenated block copolymer" means that the non-hydrogenated block copolymer described above has been subjected to hydrogenation treatment so as to control aliphatic double bonds in the conjugated diene polymer block to within a range of more than 0% and less than 100%. The preferred hydrogenation percentage of the partially hydrogenated block copolymer is 50% or more and less than 100%, preferably 80% or more and less than 100%, and most preferably 98% or more and less than 100%.

Furthermore, the (A-c-b) component used in the present embodiment preferably has a number average molecular weight of 30,000 or more and less than 300,000. When it is in the above range, a composition having excellent fluidity, impact strength, and flame retardance can be obtained.

The evaluation method for the number average molecular weight of the (A-c-b) component in the resin composition will be described below. Specifically, the (A-c-b) component is isolated using a solvent that has good solubility for the (A-c-b) component but has poor solubility for the (A-a) polyphenylene ether-based resin, such as chloroform, for example. The isolated component is then measured using a gel permeation chromatography measurement device (GPC SYSTEM21 produced by Showa Denko K.K.) and a UV spectroscopic detector (UV-41 produced by Showa Denko K.K.) so as to determine the number average molecular weight thereof as a standard polystyrene-equivalent value.

Note that the measurement conditions may be as follows: [solvent: chloroform temperature: 40° C., column: K-G, K-800RL, and K-800R at sample side and K-805L×2 at reference side, flow rate: 10 mL/min, measurement wavelength: 254 nm, and pressure: 15 kg/cm$^2$ to 17 kg/cm$^2$].

Also note that low molecular weight components resulting from catalyst deactivation during polymerization may be detected during measurement of the number average molecular weight, but these low molecular weight components are excluded from molecular weight calculation. The term "low molecular weight components" refers to components having a molecular weight of 3,000 or less. In general, the correct calculated molecular weight distribution (weight average molecular weight/number average molecular weight) is within a range of 1.0 to 1.1.

These block copolymers as the (A-c-b) component that can be used in the present embodiment may be, unless otherwise contrary to an object of the present embodiment, a mixture of two or more of those with different bonding forms, those with different aromatic vinyl compound types, those with different conjugated diene compound types, those with different 1,2-bond vinyl amount or 1,2-bond vinyl amount and 3,4-bond vinyl amount, those with different content of aromatic vinyl compound components, and those with different hydrogenation rates.

These block copolymers as the (A-c-b) component that can be used in the present embodiment can also be block copolymers that have been modified entirely or partially.

The term "modified block copolymer" refers to a block copolymer that has been modified with at least one modifying compound having, in its molecular structure, at least one carbon-carbon double or triple bond and at least one carboxylic acid group, acid anhydride group, amino group, hydroxyl group, or glycidyl group.

The method by which the modified block copolymer is produced may be a method in which, in the presence or absence of a radical initiator, (1) the block copolymer is melt-kneaded and reacted with a modifying compound in a temperature range of not lower than the softening point of the block copolymer and not higher than 250° C., (2) the block copolymer and a modifying compound are reacted in solution at a temperature that is not higher than the softening point of the block copolymer, or (3) the block copolymer and a modifying compound are reacted without melting at a temperature that is not higher than the softening point of the block copolymer. Although any of these methods may be used, method (1) is preferable, and method (1) performed in the presence of a radical initiator is most preferable.

Note that the "at least one modifying compound having, in its molecular structure, at least one carbon-carbon double or triple bond and at least one carboxylic acid group, acid anhydride group, amino group, hydroxyl group, or glycidyl group" can be the same as the modified compounds described for modified polyphenylene ether.

The preferred content of the (A-c-b) component in the present embodiment is 1 to 40 parts by mass, more preferably 2 to 35 parts by mass, and even more preferably 2 to 30 parts by mass, when the amount of the (A-a) polyphenylene ether-based resin is taken to be 100 parts by mass.

Further, in the present embodiment, from the viewpoint of allowing for control on the dielectric constant while maintaining the dielectric dissipation factor low, the sum of the contents of the (A-a) polyphenylene ether-based resin and the (A-c-b) component with respect to 100 parts by mass of the (A) thermoplastic resin is preferably 20 parts by mass or more, more preferably 25 parts by mass or more, and even more preferably 30 parts by mass or more.

[[(A-c-c) Ethylene-α-Olefin Copolymer]]

The thermoplastic resin composition of the present embodiment may contain a copolymer of ethylene and an α-olefin other than ethylene (ethylene-α-olefin copolymer, hereinafter referred to simply as "(A-c-c) component")).

Here, in view of the chemical resistance and the impact resistance of the obtained resin composition, a propylene unit is preferably excluded from the monomer unit constituting the (A-c-c) component. Here, "a propylene unit is excluded" in an "olefinic polymer constituted from an olefin excluding propylene" encompasses cases where propylene is included in an amount not hindering the effects of the present disclosure as a constitutional unit, and encompasses cases where the content of propylene unit in the (A-c-c) component in the all constitutional units constituting the (A-c-c) component is less than 0.1 mass %, for example.

Examples of the (A-c-c) component include copolymers of ethylene and one or two or more C3-C20 α-olefins, for example. Of these, the (A-c-c) component is more preferably a copolymer of ethylene and one or two or more C3-C8 α-olefins, even more preferably a copolymer of ethylene and one or two or more comonomers selected from the group consisting of 1-propylene, 1-butene, 1-hexene, 4-methyl-1-pentene, and 1-octeneone, and particularly preferably a copolymer of ethylene and 1-butene. Such a copolymer used as the (A-c-c) component tends to provide a resin composition having a higher impact resistance and a higher chemical resistance.

The (A-c-c) component may be used alone or in combination of two or more. In addition, two or more ethylene-α-olefin copolymers may be used as the (c) component.

The content of ethylene in the (A-c-c) component is preferably 5 to 95 mass % and more preferably 30 to 90 mass % relative to the total amount of the olefinic polymer, in view of the flexibility of the resin composition.

The content of α-olefins other than ethylene in the (A-c-c) component is not particularly limited. Yet, the content of α-olefin relative to the total amount of the olefinic polymer is preferably 5 mass % or more and more preferably 20 mass % or more in view of the flexibility of the resin composition; and is preferably 50 mass % or less and more preferably 48 mass % or less in view of the rigidity of the resin composition.

The brittleness temperature of the (A-c-c) component is −50° C. or lower, and is preferably −60° C. or lower and more preferably −70° C. or lower in view of achieving further excellent impact resistance and chemical resistance.

Brittleness temperatures can be measured in accordance with ASTM D746.

[[(A-c-d) Styrene-Glycidyl Methacrylate Copolymer]]

The thermoplastic resin composition of the present embodiment may include (A-c-d) a styrene-glycidyl methacrylate copolymer (hereinafter simply referred to as the "(A-c-d) component"). The (A-c-d) component acts as an admixture between the (A-a) polyphenylene ether-based resin and the (A-b-c) polyphenylene sulfide resin.

The (A-c-d) component may contain other monomer components as long as the copolymer contains styrene and glycidyl methacrylate as monomer components, but a copolymer with a total content of styrene-derived structure and glycidyl methacrylate-derived structure of 65 to 100 mass % is preferred. The total content is more preferably 75 mass % to 100 mass %, and may be 100 mass %.

In addition, the (A-c-d) component preferably contains 0.3 to 20 mass %, more preferably 1 to 15 mass %, and even more preferably 3 to 10 mass % of glycidyl methacrylate-derived structure.

[(B) Inorganic Filler]

In addition to the above components, an inorganic filler may be added to the thermoplastic resin composition of the present embodiment at any stage if needed. The inclusion of the inorganic filler reduces dimensional changes at high temperatures.

Examples of the inorganic filler include inorganic reinforcing materials in fibrous, granular, plate-like, or needle-like shapes, such as glass fibers, potassium titanate fibers, gypsum fibers, brass fibers, ceramic fibers, boron whisker fibers, mica, talc, silica, calcium carbonate, kaolin, calcined kaolin, wollastonite, zonotolite, apatite, glass beads, glass flakes, and titanium oxide. In particular, fillers with low anisotropy are preferably used. Two or more of these inorganic fillers can be used in combination. Of these, more preferred inorganic fillers are glass fibers, carbon fibers, and glass beads. Inorganic fillers that have been surface treated in a known manner using a surface treatment agent such as a silane coupling agents may also be used. However, because natural ore-based fillers often contain trace amounts of iron elements, it is necessary to select and use fillers that have been purified to remove iron elements.

The specific amount of each of these inorganic fillers added is preferably 10 mass % or less, more preferably 15 mass % or less, and even more preferably 20 mass % or less, when the amount of the entire thermoplastic resin composition is taken to be 100 mass %.

The preferred amount of inorganic fillers added as a whole is preferably 10 mass % or more, more preferably 20 mass % or more, and even more preferably 30% or more, when the entire thermoplastic resin composition is taken to be 100 mass %.

[Coloring Agent]

In the present embodiment, a method of coloring the resin composition is not particularly limited, and one or more coloring agents selected from known organic dyes and inorganic pigments can be used.

Examples of the organic dyes include azo pigments such as azo lake pigments, benzimidazolone pigments, diarylide pigments and condensed azo pigments, phthalocyanine pigments such as phthalocyanine blue and phthalocyanine green, condensed polycyclic pigments such as isoindolinone pigments, quinophthalone pigments, quinacridone pigments, perylene pigments, anthraquinone pigments, perinone pigments and dioxazine violet, azine pigments, and carbon black.

Among these, it is preferable that the carbon black has a dibutyl phthalate (DBP) absorption of less than 250 mL/100 g, and preferably less than 150 mL/100 g, and has a nitrogen adsorption specific surface area of less than 900 m$^2$/g, and more preferably less than 400 m$^2$/g. When they are in the above ranges, a composition having particularly excellent colorability, mechanical strength, and flame retardance can be obtained.

The DBP absorption amount and the nitrogen adsorption specific surface area as used herein refer to values measured with the methods specified in ASTM D2414 and JIS K6217, respectively.

Examples of the azine pigments include Solvent Black 5 (C.I. 50415, CAS No. 11099-03-9), Solvent Black 7 (C.I. 50415: 1, CAS No. 8005-20-5/101357-15-7), and Acid Black 2 (C.I. 50420, CAS No. 8005-03-6/68510-98-5) in the color index.

Examples of the inorganic pigments include metal oxides other than iron oxide such as titanium oxide, zinc oxide and chromium oxide, and composite metal oxides such as titan yellow, cobalt blue, and ultramarine.

For the above coloring agents, the content of is preferably 2 mass % or less for carbon black, 2 mass % or less for azine dyes, and 8 mass % or less for inorganic pigments, with the entire resin composition being 100 mass %. The amount is more preferably 1 mass % or less for carbon black, 1 mass % or less for azine dyes, and 5 mass % or less for inorganic pigments. When the coloring agent is added in the above content, it is possible to maintain good balance between impact resistance and mechanical properties. Further, in a case of an application that requires flame retardancy, the coloring agent is preferably added in the above content from the viewpoint of flame retardancy.

[(C) Other Components]

In addition to the above-mentioned components, the resin composition of the present embodiment may contain, as (C) other components, plasticizers (such as low-molecular weight polyolefin, polyethylene glycol, and fatty acid esters), antistatic agents, nucleating agents, fluidity improvers, reinforcing agents, various peroxides, spreading agents, copper-based heat stabilizers, organic heat stabilizers typified by hindered phenol-based oxidative deterioration inhibitors, antioxidants, ultraviolet absorbers, light stabilizers, lubricants such as ethylene bisstearate amide, and denaturants such as maleic anhydride.

The specific content of each of these (C) other components is preferably 15 mass % or less, more preferably 13 mass % or less, and even more preferably 10 mass % or less, when the amount of the entire resin composition is taken to be 100 mass %.

The preferred content of the (C) other components as a whole is preferably 30 mass % or less, more preferably 25 mass % or less, and even more preferably 20% or less, when the entire resin composition is taken to be 100 mass %.

<Properties of Producing Thermoplastic Resin Composition>

The following describes the properties of the thermoplastic resin composition of the present embodiment.

A greater value of the deflection temperature under load (DTUL) (° C.) of the thermoplastic resin composition of the present embodiment is preferred from the viewpoint that deformation is less likely to occur even when the heat generated by the base station increases with an increase in communication speed. The specific value of DTUL is 120° C. or higher, preferably 130° C. or higher, and more preferably 140° C. or higher.

Note that the deflection temperature under load (DTUL) refers to a value measured by the methods that will be described in EXAMPLES to be described later.

A smaller value of the dielectric dissipation factor of the thermoplastic resin composition of the present embodiment indicates a reduced energy loss rate and is thus preferred.

Note that the dielectric dissipation factor refers to a value measured by the method that will be described in EXAMPLES described later.

It is preferred that the temperature dependence of the dielectric dissipation factor of the thermoplastic resin composition at 28 GHz satisfies the following conditions from the viewpoint of maintaining a low dielectric dissipation factor even when the heat emitted by the base station increases with an increase in communication speed. 1. When the DTUL is 120° C. or higher and lower than 140° C., the difference between the value of dielectric dissipation factor at 23° C. and the value of the dielectric dissipation factor at 120° C. is 0.004 or less, and 2. When the DTUL is 140° C. or higher, the difference between the value of the dielectric dissipation factor at 23° C. and the value of the dielectric dissipation factor at 140° C. is 0.004 or less.

The above temperature dependence of the dielectric dissipation factor tends to be adjustable to the above range by including a thermoplastic resin with a low dielectric dissipation factor and high glass transition temperature, such as the (A-a) polyphenylene ether-based resin, in the thermoplastic resin composition.

When a temperature range while the thermoplastic resin composition is heated from −30° C. to 120° C. is divided into temperature ranges with intervals of 10° C., and a low temperature side and a high temperature side of respective two adjacent temperature ranges are defined as a low temperature range and a high temperature range, respectively, the low temperature range expansion coefficient of the thermoplastic resin composition in the TD direction (mm/mm/° C.) as measured by the method described in ISO 11359 and the high temperature range expansion coefficient of the resin composition in the TD direction (mm/mm/° C.) as measured by the method described in ISO 11359 satisfy the following relationship in any of the two adjacent temperature ranges: −50≤((high temperature range expansion coefficient−low temperature range expansion coefficient)/low temperature range expansion coefficient)×100≤50

This tends to make it more difficult for the metal coating to delaminate due to temperature changes in an antenna member molded by injection molding, and also reduces deformation of the component per se due to temperature changes.

It is more preferable that the above relationship is

−45≤((high temperature range expansion coefficient−low temperature range expansion coefficient)/low temperature range expansion coefficient)×100≤45, and it is even more preferable that the above relationship is −40≤((high temperature expansion coefficient−low temperature range expansion coefficient)/low temperature range expansion coefficient)×100≤40.

The above temperature ranges refer to ranges obtained by dividing the temperature range from −30° C. to 120° C. into 15 temperature ranges, namely, temperature ranges from −30° C. to −20° C., from −20° C. to −10° C., from −10° C. to 0° C., . . . , from 110° C. to 120° C. Two adjacent temperature ranges refer to any of 14 combinations of two adjacent temperature ranges of 15 divided temperature ranges.

The above relationship shall be satisfied in all combinations of two adjacent temperature ranges (14 combinations) selected from 15 divided temperature ranges.

Note that the above expansion coefficients in the TD direction of the resin composition measured by the method described in ISO 11359 shall mean the value measured under the conditions described in the EXAMPLES section described below using a test piece prepared by the method described in the EXAMPLES section described below.

By including a polyphenylene ether that is an amorphous thermoplastic resin with a high glass transition temperature into the thermoplastic resin composition, it is possible to reduce the change in the expansion coefficient in the adjacent temperature ranges and to adjust the above relationship of expansion coefficient.

The average value of the expansion coefficients in the TD direction measured by the method described in ISO 11359 (average value of 15 expansion coefficient values, which is sometimes referred to as "average expansion coefficient" herein) in each of divided 15 temperature ranges in 10° C. intervals when the temperature is increased from −30° C. to 120° C. is preferably $10\times10^{-5}$ mm/mm/° C. or lower, more preferably $9\times10^{-5}$ mm/mm/° C. or lower, and even more preferably $8\times10^{-5}$ mm/mm/° C. or lower, from the viewpoint of being able to suppress delamination of plating.

The above average value can be set within the above range by using a resin with a low expansion coefficient and by adjusting the type and amount of the inorganic filler.

The maximum value of the expansion coefficients of the thermoplastic resin composition of the present embodiment in the TD direction measured by the method described in ISO 11359 in the above divided 15 temperature ranges in 10° C. intervals when the temperature is increased from −30° C. to 120° C. is $10\times10^{-5}$ mm/mm/° C. or lower, more preferably $2\times10^{-5}$ mm/mm/° C. to $8\times10^{-5}$ mm/mm/° C. When the above maximum value is $10\times10^{-5}$ mm/mm/° C. or lower, large dimensional changes due to temperature rise can be suppressed and delamination of the metal coating is less likely to occur.

The above maximum value can be set within the above range by using a resin with a low expansion coefficient and by adjusting the type and amount of the inorganic filler.

(Production Method of Resin Composition)

The resin composition of the present embodiment can be produced by melt-kneading the components constituting the (A) component, and, as necessary, the coloring agent, the inorganic filler, and other components.

Examples of melt-kneading machines that can be used to perform the melt-kneading include, but are not limited to, machines that perform heated melt-kneading through a single screw extruder, a multi-screw extruder such as a twin screw extruder, a roll, a kneader, a Brabender Plastograph, a Banbury mixer, or the like. In particular, a twin screw extruder is preferable from a viewpoint of kneadability. Specific examples include the ZSK series produced by Werner & Pfleiderer, the TEM series produced by Toshiba Machine Co., Ltd., and the TEX series produced by The Japan Steel Works, Ltd.

In this process, the melting and kneading temperature that, in the case of a crystalline resin, is at least the melting point of the crystalline resin and, in the case of an amorphous resin, is at least the glass transition temperature of the non-crystalline resin, may be selected such as to enable melt-kneading and processing without difficulty. Normally, the melt-kneading temperature can be arbitrary selected from 200° C. to 370° C.

The following describes a preferable production method using an extruder.

L/D (effective barrel length/barrel internal diameter) of the extruder is preferably 20 or more and 60 or less, and more preferably 30 or more and 50 or less.

Although no specific limitations are placed on the configuration of the extruder, the extruder preferably includes a first raw material feeding inlet at an upstream side relative to the direction of raw material flow, a first vacuum vent further downstream to the first raw material feeding inlet, a second raw material feeding inlet downstream to the first vacuum vent (and also third and fourth raw material feeding inlets downstream to the second raw material feeding inlet as necessary), and a second vacuum vent downstream to the second raw material feeding inlet. In particular, more preferred is an extruder provided with a kneading section upstream to the first vacuum vent, a kneading section between the first vacuum vent and the second material feeding inlet, and a kneading section between the second to fourth material feeding inlets and the second vacuum vent.

Although no specific limitations are placed on the method by which raw materials are fed at the second to fourth raw material feeding inlets, it is preferable to adopt a method in which raw materials are fed from a side opening in the extruder using a forced side feeder because this tends to enable more stable feeding than when raw materials are simply added through an opening at the second to fourth raw material feeding inlets of the extruder.

In particular, in a situation in which a powder is included among the raw materials and it is desirable to reduce production of crosslinked products or carbides due to resin heat history, a method in which a forced side feeder is used for feeding from the side of the extruder is more preferable, and a method in which forced side feeders are provided at the second to fourth raw material feeding inlets, and such raw material powders are divided into portions for feeding is even more preferable.

Moreover, in a situation in which a liquid raw material is to be added, it is preferable to adopt a method of addition into the extruder using a plunger pump, a gear pump, or the like.

Furthermore, the upper openings of the second to fourth material feeding inlets of the extruder can also be used as openings to vent the air contained in the raw materials.

No specific limitations are placed on the melt-kneading temperature and the screw rotation speed in a step of melt-kneading the resin composition. A temperature that, in the case of a crystalline resin, is at least the melting point of the crystalline resin and, in the case of an amorphous resin, is at least the glass transition temperature of the amorphous resin, may be selected such as to enable melt-kneading and processing without difficulty. Normally, the melt-kneading temperature can be freely selected from 200° C. to 370° C., and the screw rotation speed can be 100 rpm to 1,200 rpm.

In one specific aspect of the production method of the resin composition of the present embodiment using a twin screw extruder, for example, the components constituting the (A) component and the raw material titanium dioxide are fed to the first material feeding inlet of the twin screw extruder, the heating and melting zone is set to the melting temperature of the thermoplastic resin, and melt-kneading is carried out at a screw rotation speed between 100 and 1200 rpm, preferably between 200 and 500 rpm. The components constituting the (A) component and the raw material titanium dioxide may be fed to the twin screw extruder in batch from the first material feeding inlet of the extruder as described above. Alternatively, the second material feeding inlet, the third material feeding inlet, and the fourth material feeding inlet may be provided so that the raw materials may be fed in portions.

In a situation in which production of crosslinked products or carbides due to resin heat history in the presence of oxygen is to be reduced, the oxygen concentration in individual process lines of addition paths for raw materials into the extruder is preferably maintained at less than 1.0 volume %. Although these addition paths are not specifically limited, in one specific example of configuration, an addition path comprises, in this order, piping leading from a stock tank, a gravimetric feeder having a refill tank, piping, a feed hopper, and the twin screw extruder. The method by which a low oxygen concentration is maintained is not specifically limited, but a method of introducing an inert gas into individual process lines having increased air tightness is an effective method. In general, it is preferable that nitrogen gas is introduced to maintain an oxygen concentration of less than 1.0 volume %.

In a situation in which the thermoplastic resin of the (A) component includes a component that is in the form of a powder (volume average particle diameter of less than 10 μm), the resin composition production method described above has an effect of reducing residual matter in screws of a twin screw extruder during production of the resin composition of the present embodiment using the twin screw extruder, and also has an effect of reducing generation of black spot foreign matter, carbides, and the like in the resultant resin composition obtained by the production method described above.

More specifically, production of the resin composition of the present embodiment is preferably implemented by any of the following methods 1 to 3 using an extruder in which the oxygen concentration of each raw material feeding inlet is controlled to less than 1.0 volume %.

1. A production method involving melt-kneading the entire amount of the components constituting the (A) component to be contained in the resin composition of the present embodiment (first kneading step); and feeding the entire amount of the raw material titanium dioxide to the molten kneaded product that is obtained through the first kneading step, followed by further melt-kneading (second kneading step).

2. A production method involving melt-kneading the entire amount of the components constituting the (A) component and a part of titanium dioxide to be contained in the resin composition of the present embodiment (first kneading step), feeding the remainder of titanium dioxide to the molten kneaded product that is obtained through the first kneading step, followed by further kneading (second kneading step).

3. A production method involving melt-kneading all of the components to be contained in the resin composition of the present embodiment.

In particular, because some thermoplastic resins such as the (A-a) polyphenylene ether-based resin contained in the (A) component and the raw material titanium dioxide are powdery and have poor biteability to the extruder, increasing the production rate per hour is difficult. Moreover, resin thermal degradation tends to occur due to the long residence time of resin in the extruder. In the production method 1 or 2 described above, the biteability of titanium dioxide is improved, each component is favorably mixed, decomposition caused by thermal degradation and generation of cross-linked substances and carbonized materials can be reduced, the production rate per hour of resin can be increased, and a resin composition having an excellent productivity and quality can be obtained. In view of the above, a resin composition obtained by the production method 1 or 2 is more preferred compared to a resin composition obtained by the production method 3.

[Injection Molded Body, Antenna Member]

An injection molded body of the present embodiment is made of the thermoplastic resin composition described above. The method of producing the injection molded body of the present embodiment is not particularly limited except that injection molding is used. In injection molding, injection foam molding can be carried out to further reduce the weight. Both chemical and physical foaming are effective and can contribute to weight reduction.

In addition, the mode where a metal coating is formed on the surface of the injection molded body that has been produced by such a method is used is also envisioned.

The antenna member of the present embodiment has one or more of the above injection molded body. The antenna member may have a structure in which multiple injection molded bodies are mated with each other.

By having the above injection molded body, the antenna member of the present embodiment can be easily applied to antenna parts, especially to parts that require to be plated and are exposed to high temperatures, such as antenna filters and antenna elements (pendulums). In particular, usage of a material of which expansion coefficient of two adjacent temperature ranges satisfies the relationship specified in the present embodiment is desirable because delamination of the metal coating or changes of shape are prevented when the temperature rises.

[Metal Coating of Antenna Member]

The method of providing a metal coating on at least a part of the above antenna member is not particularly limited, and any conventionally known method can be used. The metal coating can be formed on an insulation layer by dry or wet plating. In the case of wet plating, the surface of the injection molded body is first roughened (etched) with an oxidant such as permanganate (potassium permanganate, sodium permanganate, etc.), dichromate, ozone, hydrogen peroxide/sulfuric acid, nitric acid, or the like to form irregular anchors. A water solution of potassium permanganate, sodium permanganate, or the like in sodium hydroxide (water solution of alkaline permanganate) are particularly preferred as the oxidant. Next, a metal coating is formed by a combination of electroless plating and electrolytic plating. It is also possible to form a plating resist having the reverse pattern of the pattern of the metal coating to be formed and form the metal coating only by electroless plating. Subsequent patterning methods that can be used may be subtractive and semi-additive methods known to those skilled in the art.

In the case of dry plating, known methods such as evaporation, sputtering, and ion plating can be used. Physical vapor deposition (PVD) methods, chemical vapor deposition (CVD) methods, and liquid phase growth are mainly used. For example, physical vapor deposition (PVD) methods include vacuum evaporation, molecular beam epitaxy (MBE), sputtering, ionized evaporation, laser ablation, ion cluster beam method, etc.; chemical vapor deposition (CVD) methods include thermal CVD, plasma CVD, metal organic CVD (MOCVD), chemical vapor transport (CVT), substrate reaction method, etc.; and liquid phase growth methods include liquid phase epitaxy, traveling solvent method, source current control method, etc. Other methods include electroless plating methods. Among the above methods, vacuum evaporation, sputtering, and plasma CVD are preferred in view of control on the film thickness, control on the film quality, versatility, and productivity.

Vacuum evaporation is a method in which a target for forming a film is caused to be evaporated and deposited on a substrate by heating with electron beam or a resistance heater. It is preferable that deposition is performed at 0.5 to 100 Ø/sec after the initial vacuum degree upon evaporation is reduced to $1\times10^{-2}$ Pa or less, preferably $1\times10^{-3}$ Pa or less.

Sputtering is a method in which high kinetic energy particles such as argon ions supplied by a non-thermal equilibrium glow discharge plasma atmosphere or ion beam from an ion source is made to strike on a target for forming a film to cause particles emitted from the target, which are deposited on the substrate.

Plasma CVD is a widely used method for forming hydrogenated amorphous Si films. For example, silane ($SiH_4$) gas is decomposed by a high-frequency glow discharge and made to be deposited on a substrate. The total pressure during discharge is 0.1 to 1 torr (13 to 130 Pa), the gas concentration is 10 mass % or more in the case of being diluted with argon or hydrogen, the gas flow rate is 50 to 200 mL/min, and the input power is in the order of ten to the order of hundred $mW/cm^2$.

The metal used for the metal coating of the present embodiment is not limited, but copper or gold with high electrical conductivity is preferred, for example.

[Circuit Formation for Antenna Member]

The antenna member of the present embodiment may be used after a metal ink is applied or plating is applied.

The antenna member of the present embodiment may include one or more selected from the group consisting of a metal circuit, metal wiring, and a metal base.

From this viewpoint, an injection molded body which can be coated with a metal ink is preferably used as the injection molded body of the present embodiment. Any of gold, silver, and copper may be used in the metal ink. Furthermore, an ink containing multiple metals can be used.

The same is applicable to plating, and any metal can be used. Copper is preferred in view of conductivity, but lead, tin, gold, or silver can also be used.

The antenna member of the present embodiment has a high capability to prevent copper damage, and can reduce cracking after application of the above metal ink or plating because it tends to have low water absorption.

For example, the metal ink can be applied and then adhered to the resin in various ways. Even methods that require heat resistance, such as method by using laser to achieve adhesion, can be used for the antenna member of the present embodiment.

For example, the inkjet method can be used to draw and form circuit patterns on a circuit board using a conductive metal paste on the antenna member. This circuit patterning method can rely on known methods (see, for example, JP 2002-324966 A).

The conductive metal paste used is a conductive metal paste prepared by uniformly dispersing ultrafine metal particles having a small average particle diameter in a thermosetting resin composition containing an organic solvent. The ultrafine metal particles with small average particle diameters are selected so that the average particle diameters are in the range of 1 to 100 nm. The surfaces of the ultrafine metal particles are suitably coated with one or more compounds having a group containing a nitrogen, oxygen, or sulfur atom as a group capable of coordinatively bonding with the metal element contained in such ultrafine metal particles.

As the fine metal ultrafine particles having a small average particle diameter to be contained in the above conductive metal paste, fine particles consisting of one metal or an alloy consisting of two or more metals selected from the group consisting of gold, silver, copper, platinum, palladium, tungsten, nickel, tantalum, bismuth, lead, indium, tin, zinc, titanium, and aluminum.

The circuit pattern forming method has the steps of spraying or applying the above conductive metal paste as minute droplets onto a substrate to draw a circuit pattern of a coated film of the conductive metal paste, and thermally treating the coated film of the drawn conductive metal paste at a temperature equal to or higher than the thermosetting temperature of the thermosetting resin.

Inkjet drawing methods include thermal drawing methods by generating bubbles by heating and ejecting droplets, and piezoelectric drawing methods by ejecting droplets by compression using a piezoelectric element.

When the circuit is formed by plating, methods that allow selective plating of copper, nickel, or the like on an area irradiated with laser can be used.

[Dielectric Properties of Antenna Member]

The antenna member of the present embodiment can be used for applications that require a material with a low dielectric dissipation factor, particularly in high frequency ranges. In such applications, control on the dielectric dissipation factor is an important technology because a large loss will reduce the performances of the component as a component for telecommunication apparatus. The present embodiment can provide an antenna member molded by injection molding that retains adhesion to the metal coating and has little dimensional change and little change in dielectric dissipation factor in high temperature ranges.

The antenna member of the present embodiment can be used for filters or antenna elements (pendulum components) of antennas for communication apparatuses, since the antenna member can handle information in any frequency from low to high frequencies. It is particularly suitable in outdoor or indoor heavy antenna base stations, since various characteristics can be maintained while these characteristics can be exhibited in low or high temperatures or wet environments.

EXAMPLES

The following provides a more detailed description of the present embodiment through examples and comparative examples. However, the present embodiment is not limited to the following examples.

Raw materials and evaluation methods used in the examples and comparative examples were as follows.

[Raw Materials]
(A-a) Polyphenylene Ether (Hereinafter Referred to as PPE)
(A-α-1) Polyphenylene ether resin obtained by oxidative polymerization of 2,6-xylenol The reduced viscosity (measured with 0.5 g/dL chloroform solution at 30° C.) of the polyphenylene ether resin was 0.52 dL/g. Tg was about 210° C.

(A-α-2) Polyphenylene ether resin obtained by oxidative polymerization of 2,6-xylenol The reduced viscosity (measured with 0.5 g/dL chloroform solution at 30° C.) of the polyphenylene ether resin was 0.40 dL/g. Tg was about 210° C.

(A-α-3) Polyphenylene ether resin obtained by oxidative polymerization of 2,6-xylenol The reduced viscosity (measured with 0.5 g/dL chloroform solution at 30° C.) of the polyphenylene ether resin was 0.32 dL/g. Tg was about 210° C.

(A-b) Crystalline Resin
(A-b-a) Polyamide
(A-b-α-1) Polyamide 6,6 (Hereinafter Referred to as PA66)

In a 5-liter autoclave, 2400 g of an equimolar salt of adipic acid and hexamethylenediamine, 100 g of adipic acid, and 2.5 liters of pure water were charged and stirred sufficiently. After the atmosphere in the autoclave was sufficiently replaced with nitrogen, the temperature was raised from room temperature to 220° C. under stirring for about 1 hour. In this step, the gauge pressure in the autoclave reached 1.76 MPa at natural pressure of water vapor. Subsequently, heating was continued while water was removed from the reaction system such that the pressure is prevented from reaching 1.76 MPa or higher. After another 2 hours, when the internal temperature reached 260° C., the autoclave was depressurized by opening and closing the autoclave valve over about 40 minutes until the internal pressure dropped to 0.2 MPa while heating was continued. The reactant was then allowed to cool to room temperature over about 8 hours. After cooling, the autoclave was opened and about 2 kg of a polymer was removed and ground.

The polyamide obtained had an Mw of 38,700 and Mw/Mn of 2.1. Note that Mw and Mn were determined using GPC (mobile layer: hexafluoroisopropanol, standard: PMMA (polymethyl methacrylate)).

The end amino group concentration was measured according to the method for measuring the end amino group concentration described in EXAMPLES in JP H7-228689 A, and was determined to be 38 µmol/g. Tg was about 50° C.

(A-b-α-2) Polyamide 9,T (Hereinafter Referred to as PA9T)

A 40-L autoclave was charged with 9743.5 g (58.65 mol) of terephthalic acid, 8072.3 g (51.0 mol) of 1,9-nonane diamine, 1424.6 g (9.0 mol) of 2-methyl-1,8-octane diamine, 329.7 g (2.7 mol) of benzoic acid, 19.6 g of sodium hypophosphite monohydrate (0.1 mass % with respect to the raw materials), and 5 L of distilled water, and was replaced with nitrogen.

The mixture was stirred at 100° C. for 30 minutes, and the internal temperature was raised to 210° C. over 2 hours. At this time, the pressure of the autoclave increased to 22 kg/cm². After the reaction was continued for 1 hour, the temperature was raised to 230° C. The temperature was maintained at 230° C. for 2 hours, and the reaction was caused to take place while the pressure was maintained at 22 kg/cm² by gradually venting water vapor. Then, the pressure was reduced to 10 kg/cm² over 30 minutes and the reaction was further caused to take place for another 1 hour to yield a prepolymer having a limiting viscosity [η] of 0.25 dl/g. The resultant was dried under reduced pressure at 100° C. for 12 hours, and pulverized into a size of 2 mm or less. The resultant was subjected to solid-phase polymerization at 230° C. at 0.1 mmHg for 10 hours to yield a polyamide having a melting point of 306° C. and a limiting viscosity [η] of 0.80 dl/g. The end amino group concentration was measured according to the method for measuring the amino end group concentration described in EXAMPLES in JP H7-228689 A, and was determined to be 20 µmol/g. Tg was about 125° C.

(A-b-b) Polypropylene
(A-b-b-1) Polypropylene Homopolymer of Polypropylene MFR=2 g/10 Min The MFR was measured under conditions of a temperature of 230° C. and a load of 2.16 kg in accordance with ISO1133. Tg was about 0° C.

(A-b-b-2) Polypropylene modified with maleic anhydride having a number average molecular weight (Mn) of 60,000 and a weight average molecular weight (Mw) of 91,000. Tg was about 0° C.

(A-b-c) Polyphenylene Sulfide Resin
(A-b-c-1): Linear PPS having a p-phenylene sulfide repeating unit and having a melt viscosity (value measured after being held at 300° C. under a load of 196 N and L/D of 10/1 for 6 minutes using a flow tester) of 30 Pa·s, an extraction amount by methylene chloride of 0.7 mass %, and an amount of —SX groups of 32 µmol/g. Tg was about 80° C.

(A-b-c-2): Crosslinked PPS having a melt viscosity (measured after being held at 300° C. under a load of 196 N and L/D of 10/1 for 6 minutes using a flow tester) of 60 Pa·s, and a volatile content of 160 mass ppm collected in a molten state at 320° C. Tg was about 80° C.

(A-c) Amorphous Thermoplastic Resin Other than Polyphenylene Ether
(A-c-a) Polystyrene-Based Resin
(A-c-α-1) High impact polystyrene (H9405 manufactured by PS Japan Corporation). Tg was about 100° C.
(A-c-α-2) High impact polystyrene (Product name: "CT-60", manufactured by Petrochemicals Corporation). Tg was about 100° C.
(A-c-α-3) Polystyrene (GPPS 680 manufactured by PS Japan Corporation). Tg was about 100° C.

(A-c-b) Block copolymer containing at least one block mainly composed of aromatic vinyl monomer unit and at least one block mainly composed of conjugated diene monomer unit, and/or hydrogenated product of the block copolymer (A-c-b-1) Hydrogenated block copolymer (TUFTEC™ H1051 manufactured by Asahi Kasei Corporation)
(A-c-b-2) Hydrogenated block copolymer (TUFTEC™ H1081 manufactured by Asahi Kasei Corporation)
(A-c-b-3)

A block copolymer having a block structure of II-I-II-I was synthesized with a known method, where the polymer block I was made of polystyrene and the polymer block II was made of polybutadiene. Hydrogenation was performed on the synthesized block copolymer with a known method. No modification of polymer was performed. The physical properties of the obtained unmodified hydrogenated block copolymer are described below.

Polystyrene content in the block copolymer after hydrogenation: 44 mass %, number average molecular weight (Mn) of the block copolymer after hydrogenation: 95300, weight average molecular weight (Mw): 113600, amount of 1,2-vinyl bond (total vinyl bond amount) in the polybutadiene block after hydrogenation: 79%, hydrogenation rate to the polybutadiene moiety forming the polybutadiene block: 99%

(A-c-b-4)
Styrene-ethylene-propylene-styrene block copolymer elastomer (SEPTON 2023 manufactured by KURARAY CO., LTD.)
(A-c-c) Ethylene-α-Olefin Copolymer
(A-c-c-1) Ethylene-α-olefin copolymer (TAFMER P-0680J manufactured by Mitsui Chemicals, Inc.)
(A-c-d) Styrene-Glycidyl Methacrylate Copolymer
(A-c-d-1) Styrene-glycidyl methacrylate copolymer containing 5 mass % of glycidyl methacrylate (weight average molecular weight: 110,000)
(A-c-e) Thermoplastic norbornene resin
(A-c-e-1) Thermoplastic norbornene resin (ZEONEX 480 manufactured by ZEON Corporation). Tg was about 140° C.
(B) Inorganic Filler
(B-1) Glass fiber (ECS03-T249 manufactured by NEG Co., Ltd.)
(B-2) Glass fiber (ECS03-T747 manufactured by NEG Co., Ltd.)
(B-3) Glass fiber (ECS03-T497 manufactured by NEG Co., Ltd.)
(B-4) Talc (High toron A manufactured by Takehara Kagaku Kogyo Co., Ltd)
(B-5) Talc (Talcane powder PK-C manufactured by Hayashi Kasei Co. Ltd.)
(B-6) Glass flake (FLEKA REFG-301 manufactured by Nippon Sheet Glass Co., Ltd.)
(B-7) Glass flake (MEG160FY M06 manufactured by Nippon Sheet Glass Co., Ltd.)
(Other Components)
(C-1) Ethylenebis stearate amide ("KAO WAX EB-G" manufactured by Kao Corporation)
(C-2) Maleic anhydride ("Crystal MAN", manufactured by NOF CORPORATION)
(C-3) Peroxide ("Perhexa 25B-40" manufactured by NOF Corporation)
[Evaluation Methods]
Evaluation tests performed in the examples and comparative examples were conducted as described below.
(1-1), (1-2) Dielectric Constant and Dielectric Dissipation Factor at 1 GHz Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to produce a flat plate of 60 mm×60 mm×2.0 mm. The flat plate was cut out and was measured under the following conditions.

Measurement apparatus: Vector network analyzer HP8510C (Agilent Technologies)
Synthesized sweeper HP83651A (same as above)
Test set HP8517B (same as above)
Dimensions of specimen: 40 mm×4 mm×2.0 mm
Shape of resonator: Cylinder with an inner diameter of 229 mm and a height of 40 mm
Measuring direction: 1 direction
Measurement frequency: about 1 GHz (TM010 mode)
Pretreatment: 90 h/22±1° C./60±5% RH Test environment: 22° C./56% RH It was determined that a lower dielectric dissipation factor indicated better performance.
(1-3), (1-4) Dielectric Constant and Dielectric Dissipation Factor at 28 GHz Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 20 seconds to produce a flat plate of 150 mm×150 mm×4.0 mm. The dielectric constant at 28 GHz was measured at the following conditions.

Measurement frequency: 22 GHz to 33 GHz
Measurement method: Frequency variation method
Measurement apparatus: Vector network analyzer (Keysight PNA N5247B 10 MHz to 67 GHz), free-space type S parameter measurement fixture for high frequency by KEYCOM Corp., control PC
Environmental conditions for measurement: room temperature of 26° C. and a humidity of 50%

(1-5) Dielectric Dissipation Factor after Water Absorption
Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 20 seconds to produce a flat plate of 60 mm×60 mm×0.9 mm. After the flat plate was immersed in warm water at 80° C. for 144 hours, the dielectric dissipation factor at 10 GHz was measured at the following conditions.

Measurement frequency: 10 GHz
Measurement apparatus: 10 MHz to 43.5 GHz PNA network analyzer N5224B, 10 GHz Split Post Dielectric Resonator N1501AE10
Environmental conditions for measurement: room temperature of 23° C. and a humidity of 50%.

(2) Deflection Temperature Under Load (DTUL)
Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to prepare an ISO dumbbell for evaluation by using conditions and a mold compliant with ISO dumbbell molding conditions. This ISO dumbbell was then cut to produce a test piece for deflection temperature under load (DTUL) measurement.

The deflection temperature under load: DTUL (ISO 75: under a load of 1.80 MPa) was measured using the above measurement test piece for deflection temperature under load.

A larger value was judged to indicate better heat resistance.

(3) Platability

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to produce a flat plate of 90 mm×50 mm×2.5 mm. After the flat plate was etched with chromic acid, electroless copper plating was applied to the flat plate. The sample was evaluated as "O" when the entire surface of the flat plate was plated, or evaluated as "X" when not plated, and a sample with favorably plated was determined to be excellent as components for telecommunication apparatuses.

In addition, after subjecting the plating to 30 cycles of heat cycle tests between −30° C. and 8° C., with each cycle lasting 60 minutes, an X-shaped incision was made in the plating using a craft knife. Subsequently, a peel-off test was conducted by applying Cellophane® tape. The sample was evaluated as "O" when the plating did not peel off, or was evaluated as "X" when the plating peeled off. A sample with less peeling of plating was determined to be excellent as components for telecommunication apparatuses. A plating was determined to be peeled off when 10% or more of the area of the resin surface was visible in the portion where Cellophane® tape was applied and it peeled off (taken as 100%).

(4) Temperature Dependence of Dielectric Dissipation Factor at 28 GHz

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 250 MPa, an injection time of 20 seconds, and a cooling time of 15 seconds to produce a flat plate of 60 mm×60 mm×0.9 mm. The flat plate was cut to into the dimensions of 37 mm×37 mm×0.9 mm and the dielectric dissipation factor was measured using the following apparatus. In this test, for materials with a DTUL of 120° C. or higher and 140° C. or lower, the value of the dielectric dissipation factor at 23° C. was compared to the value of the dielectric dissipation factor at 120° C. For materials with a DTUL of 140° C. or higher, the value of the dielectric dissipation factor at 23° C. was compared to the value of the dielectric dissipation factor at 140° C. A sample with a smaller difference between these was determined to be excellent as components for telecommunication apparatuses.

Measurement apparatus: N5227B PNA Microwave Network Analyzer 67 GHz manufactured by Keysight Technologies Resonator; Balanced circular disk resonator manufactured by FATEC Constant temperature bath: SU-662 manufactured by ESPEC (5) Expansion Coefficient Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to prepare an ISO dumbbell for evaluation by using conditions and a mold compliant with ISO dumbbell molding conditions. In addition, a test piece was cut out from the ISO dumbbell as illustrated in FIG. 1, which was allowed to stand in a laboratory controlled at a temperature of 23° C. and a humidity of 50% RH for 168 hours. The expansion coefficient was then measured by a thermomechanical analysis apparatus (TMA, product name: TMA/SS6100, manufactured by SII Technology, Inc.) according to the method described in ISO 11359, under the following conditions.

After annealing treatment at 100° C. for 4 h, the test piece was cooled to −40° C. under a nitrogen atmosphere (flow rate: 100 ml/min) at a compression load of 3 gf, and then heated to 150° C. at a rate of 5° C./min to measure the expansion coefficient in the TD direction. Expansion coefficients were measured in each temperature range (15 temperature ranges) in 10° C. intervals from −30° C. to 120° C.

The highest expansion coefficient of the expansion coefficients in the 15 temperature ranges was taken as the maximum value of the expansion coefficients (mm/mm/° C.), and the average value of the expansion coefficients in the 15 temperature ranges was calculated to be used as the average expansion coefficient (average expansion coefficient) (mm/mm/° C.).

In addition, when the low temperature side of the two adjacent temperature ranges was defined as a low temperature range, and the high temperature side was defined as a high temperature range, the change ratio of expansion coefficient between the low temperature range and the high temperature range was determined from the expansion coefficient in the low temperature range (low temperature range expansion coefficient (mm/mm/° C.)) and the expansion coefficient in the high temperature range (high temperature range expansion coefficient (mm/mm/° C.)) using the following formula. The largest change ratio was determined as the maximum value of the change ratio of (%).

(Change ratio of expansion coefficient between low high temperature range and high temperature range)=(high temperature range expansion coefficient−low temperature range expansion coefficient/low temperature range expansion coefficient)×100

The above two arbitrary adjacent temperature ranges refer to two adjacent temperature ranges of 14 combinations of the 15 temperature ranges in 10° C. intervals (temperature ranges from −30° C. to −20° C., from −20° C. to −10° C., from −10° C. to 0° C., . . . , from 110° C. to 120° C.), such as a combination of a low temperature range of −30° C. to −20° C. and a high temperature range of −20° C. to −10° C., a combination of a low temperature range of −20° C. to −10° C. and a high temperature range of −10° C. to 0° C., . . . and so on.

(6) Antenna Efficiency at High and Low Temperatures

Simulation of antenna efficiency was performed under the following conditions.

Antenna substrate: 60×7×1 mm³, solid GND on all surface, pattern width: 1 mm, thickness: 25 μm.

Copper+Ni plating

Main substrate: 60×130×1 mm³, relative dielectric constant: 4.0, dielectric loss: 0.020

Thickness 35 μm, conductivity 5.8×10⁷ S/m

Simulation apparatus: MW STUDIO from CST

The reflection coefficient was adjusted to be 6 dB or less in the operating frequency band.

Dielectric properties of material (dielectric constant and dielectric dissipation factor)

The dielectric properties of the material were measured by the method described in (4).

<High Temperature Range>

The following values were used depending on the DTUL value of the material.

Dielectric properties at 100° C. for materials with a DTUL of 120° C. or lower

Dielectric properties at 120° C. for materials with DTUL 120° C. or higher and 140° C. or lower Dielectric properties at 140° C. for materials with DTUL of 140° C. or higher <Low Temperature Range>

Dielectric properties at −30° C. were used.

The total efficiency at 4 GHz was then obtained from the simulation, and the total efficiency was used as the antenna efficiency. A total efficiency closer to 0 is considered to be favorable and considered to indicate a better antenna performance.

Examples 1 to 13 and Comparative Examples 1 to 5

A resin composition was produced by blending (A) a thermoplastic resin and other components in the compositions summarized in Table 1, using a twin-screw extruder ZSK-40 (manufactured by Coperion Werner & Pfleider, Germany). This twin screw extruder was provided with a first material feeding inlet provided on the upstream to the flow direction of the material, a first vacuum vent provided downstream to the first material feeding inlet, a second material feeding inlet provided in the midstream, a third material feeding inlet provided downstream to second material feeding inlet, and a second vent provided downstream to the third material feeding inlet.

Using the extruder configured as described above, each component was added in the composition and addition method summarized in Tables 1 and 2, and molten and kneaded under the conditions of an extrusion temperature from 250 to 320° C., a screw rotation speed of 300 rpm, and a discharge rate of 100 kg/hour to produce pellets.

The obtained resin composition pellets were used to conduct evaluations mentioned above. Evaluation results are summarized in Tables 1 and 2.

TABLE 1

| | | | | Example 1 | Example 2 | Example 3 | Example 4 | Example 5 | Example 6 | Example 7 |
|---|---|---|---|---|---|---|---|---|---|---|
| Production method of resin composition | Upstream supply port | Component (A-a-1) | parts by mass | — | 26 | 30 | 30 | 25 | 12 | — |
| | | Component (A-a-2) | parts by mass | 83 | — | — | — | — | — | 18 |
| | | Component (A-a-3) | parts by mass | — | — | — | — | — | — | — |
| | | Component (A-b-b-1) | parts by mass | — | — | — | — | — | — | — |
| | | Component (A-b-c-1) | parts by mass | — | — | 15 | 10 | 35 | 48 | — |
| | | Component (A-b-c-2) | parts by mass | — | — | 45 | 30 | — | — | — |
| | | Component (A-c-a-1) | parts by mass | 17 | 7 | — | — | — | — | — |
| | | Component (A-c-a-2) | parts by mass | — | 14 | — | — | — | — | — |
| | | Component (A-c-a-3) | parts by mass | — | 17 | — | — | — | — | — |
| | | Component (A-c-b-1) | parts by mass | — | — | — | — | — | — | — |
| | | Component (A-c-b-2) | parts by mass | — | — | 6 | — | — | — | — |
| | | Component (A-c-b-3) | parts by mass | — | — | — | — | — | — | — |
| | | Component (A-c-b-4) | parts by mass | — | — | — | — | — | — | — |
| | | Component (A-c-c-1) | parts by mass | — | — | 5 | 0.5 | 2 | 3 | — |
| | | Component (A-c-d-1) | parts by mass | — | — | 3 | 2 | 2 | 2 | — |
| | | Component (A-c-e-1) | parts by mass | — | — | — | — | — | — | — |
| | | Component (C-1) | parts by mass | — | 0.05 | — | — | — | — | — |
| | | Component (C-2) | parts by mass | — | 0.03 | — | — | — | — | 0.2 |
| | | Component (C-3) | parts by mass | — | — | — | — | — | — | 0.05 |
| | Midstream supply inlet | Component (A-b-a-1) | parts by mass | — | — | — | — | — | — | — |
| | | Component (A-b-a-2) | parts by mass | — | — | — | — | — | — | 42 |
| | | Component (A-b-b-1) | parts by mass | — | — | — | — | — | — | — |
| | | Component (A-b-b-2) | parts by mass | — | — | — | — | — | — | — |

TABLE 1-continued

| | | | | | | | | | | |
|---|---|---|---|---|---|---|---|---|---|---|
| | Downstream supply inlet | Component (B-1) | parts by mass | — | 30 | — | — | — | — | — |
| | | Component (B-2) | parts by mass | — | — | — | 30 | — | — | 40 |
| | | Component (B-3) | parts by mass | — | — | — | — | — | — | — |
| | | Component (B-4) | parts by mass | — | — | — | — | — | — | 0.2 |
| | | Component (B-5) | parts by mass | — | — | — | — | — | — | — |
| | | Component (B-6) | parts by mass | — | — | — | — | 40 | — | — |
| | | Component (B-7) | parts by mass | — | — | — | — | — | 40 | — |
| Evaluation | (1-1) Dielectric constant at 1 GHz | | — | 2.6 | 3.1 | 2.8 | 3.5 | 4.1 | 4.5 | 3.8 |
| | (1-2) Dielectric dissipation factor at 1 GHz | | — | 0.0012 | 0.0024 | 0.0014 | 0.0038 | 0.0118 | 0.0083 | 0.0092 |
| | (1-3) Dielectric constant at 28 GHz | | — | 2.6 | 3.1 | 2.8 | 3.5 | 4.2 | 4.5 | 3.8 |
| | (1-4) Dielectric dissipation factor at 28 GHz | | — | 0.0019 | 0.0026 | 0.0022 | 0.0046 | 0.0128 | 0.0092 | 0.0099 |
| | (1-4) Dielectric dissipation factor at 10 GHz after water absorption | | — | 0.0013 | 0.0025 | 0.0014 | 0.0038 | 0.0118 | 0.0083 | 0.0132 |
| | (2) DTUL | | °C | 158 | 135 | 170 | 247 | 188 | 240 | 274 |
| | (3-1) Platability | | — | O | O | O | O | O | O | O |
| | (3-2) Adhesion strength of plating | | — | O | O | O | O | O | O | O |
| | (4) Temperature dependence of dielectric dissipation factor at 28 GHz | | — | 0.00001 | 0.00001 | 0.00181 | 0.00171 | 0.00210 | 0.00245 | 0.00291 |
| | (5-1) Average value of expansion coefficient | | $10^{-6} \times$ mm/mm/°C | 68 | 69 | 67 | 57 | 31 | 36 | 55 |
| | (5-2) Rate of change when rate of change in expansion coefficient is maximum | | % | 20 | 18 | 13 | 19 | 7 | 20 | 5 |
| | (5-3) Maximum value of expansion coefficient | | $10^{-6} \times$ mm/mm/°C | 77 | 77 | 87 | 79 | 40 | 58 | 67 |
| | (6-1) Antenna efficiency at high temperature | | dB | 1.6 | −2.0 | −1.9 | −2.5 | −2.9 | −2.7 | −2.7 |
| | (6-2) Antenna efficiency at low temperature | | dB | 1.6 | −2.0 | −1.8 | −2.1 | −2.8 | −2.7 | −2.7 |

| | | | | Example 8 | Example 9 | Example 10 | Example 11 | Example 12 | Example 13 |
|---|---|---|---|---|---|---|---|---|---|
| Production method of resin composition | Upstream supply port | Component (A-a-1) | parts by mass | — | — | — | — | — | — |
| | | Component (A-a-2) | parts by mass | — | 15 | 40 | 63 | 17 | 14 |
| | | Component (A-a-3) | parts by mass | 23 | — | — | — | — | — |
| | | Component (A-b-b-1) | parts by mass | — | — | — | 10 | 15 | — |
| | | Component (A-b-c-1) | parts by mass | — | — | — | — | — | 55 |
| | | Component (A-b-c-2) | parts by mass | — | — | — | — | — | — |
| | | Component (A-c-a-1) | parts by mass | — | — | — | — | — | — |
| | | Component (A-c-a-2) | parts by mass | — | — | — | — | — | — |
| | | Component (A-c-a-3) | parts by mass | 26 | — | — | — | — | — |
| | | Component (A-c-b-1) | parts by mass | — | — | 10 | — | — | — |
| | | Component (A-c-b-2) | parts by mass | — | — | — | — | — | — |
| | | Component (A-c-b-3) | parts by mass | — | — | — | 9 | 10 | — |
| | | Component (A-c-b-4) | parts by mass | — | — | — | — | — | — |
| | | Component (A-c-c-1) | parts by mass | — | — | — | — | 0.5 | — |
| | | Component (A-c-d-1) | parts by mass | — | — | — | — | 2 | — |
| | | Component (A-c-e-1) | parts by mass | — | — | — | — | — | — |

TABLE 1-continued

|  |  |  |  |  |  |  |  |  |  |
|---|---|---|---|---|---|---|---|---|---|
|  |  | Component (C-1) | parts by mass | — | — | — | — | — | — |
|  |  | Component (C-2) | parts by mass | 0.06 | 0.15 | 0.35 | — | — | — |
|  |  | Component (C-3) | parts by mass | — | 0.04 | 0.1 | — | — | — |
|  | Mid-stream supply inlet | Component (A-b-a-1) | parts by mass | — | — | 50 | — | — | — |
|  |  | Component (A-b-a-2) | parts by mass | — | 35 | — | — | — | — |
|  |  | Component (A-b-b-1) | parts by mass | — | — | — | 17 | 25 | — |
|  |  | Component (A-b-b-2) | parts by mass | — | — | — | — | 1 | — |
|  | Down-stream supply inlet | Component (B-1) | parts by mass | — | — | — | — | — | — |
|  |  | Component (B-2) | parts by mass | — | — | — | — | — | 30 |
|  |  | Component (B-3) | parts by mass | — | — | — | — | 30 | — |
|  |  | Component (B-4) | parts by mass | — | 0.2 | — | — | — | — |
|  |  | Component (B-5) | parts by mass | — | — | — | — | — | — |
|  |  | Component (B-6) | parts by mass | — | — | — | — | — | — |
|  |  | Component (B-7) | parts by mass | 50 | 50 | — | — | — | — |
| Eval-uation | (1-1) Dielectric constant at 1 GHz | | — | 3.8 | 4.0 | 2.9 | 2.5 | 2.8 | 3.6 |
|  | (1-2) Dielectric dissipation factor at 1 GHz | | — | 0.0040 | 0.0081 | 0.0093 | 0.0011 | 0.0021 | 0.0031 |
|  | (1-3) Dielectric constant at 28 GHz | | — | 3.8 | 4.0 | 3.0 | 2.5 | 2.8 | 3.7 |
|  | (1-4) Dielectric dissipation factor at 28 GHz | | — | 0.0044 | 0.0090 | 0.0101 | 0.0012 | 0.0021 | 0.0039 |
|  | (1-4) Dielectric dissipation factor at 10 GHz after water absorption | | — | 0.0040 | 0.0112 | 0.0134 | 0.0011 | 0.0021 | 0.0032 |
|  | (2) DTUL | | °C. | 142 | 266 | 130 | 120 | 147 | 270 |
|  | (3-1) Platability | | — | O | O | O | O | O | O |
|  | (3-2) Adhesion strength of plating | | — | O | O | O | O | O | O |
|  | (4) Temperature dependence of dielectric dissipation factor at 28 GHz | | — | 0.00010 | 0.00260 | 0.00326 | 0.00361 | 0.00380 | 0.00213 |
|  | (5-1) Average value of expansion coefficient | | $10^{-6}$ × mm/mm/°C. | 32 | 31 | 80 | 90 | 121 | 55 |
|  | (5-2) Rate of change when rate of change in expansion coefficient is maximum | | % | 5 | 10 | 16 | 15 | 14 | 14 |
|  | (5-3) Maximum value of expansion coefficient | | $10^{-6}$ × mm/mm/°C. | 36 | 37 | 110 | 120 | 140 | 75 |
|  | (6-1) Antenna efficiency at high temperature | | dB | −2.1 | −2.7 | −2.6 | −2.0 | −2.1 | −2.1 |
|  | (6-2) Antenna efficiency at low temperature | | dB | −2.1 | −2.7 | −2.6 | −1.8 | −1.8 | −1.8 |

TABLE 2

|  |  |  |  | Comp. Example 1 | Comp. Example 2 | Comp. Example 3 | Comp. Example 4 | Comp. Example 5 |
|---|---|---|---|---|---|---|---|---|
| Production method of resin composition | Upstream supply port | Component (A-a-1) | parts by mass | — | — | — | — | — |
|  |  | Component (A-a-2) | parts by mass | — | — | — | — | — |
|  |  | Component (A-a-3) | parts by mass | — | — | — | — | — |
|  |  | Component (A-b-b-1) | parts by mass | — | — | — | 60 | — |
|  |  | Component (A-b-c-1) | parts by mass | 90 | — | — | — | — |
|  |  | Component (A-b-c-2) | parts by mass | 10 | 60 | — | — | — |
|  |  | Component (A-c-a-1) | parts by mass | — | — | — | — | — |
|  |  | Component (A-c-a-2) | parts by mass | — | — | — | — | — |
|  |  | Component (A-c-a-3) | parts by mass | — | — | — | — | — |
|  |  | Component (A-c-b-1) | parts by mass | — | — | — | — | — |
|  |  | Component (A-c-b-2) | parts by mass | — | — | — | — | — |

TABLE 2-continued

|  |  |  |  | Comp. Example 1 | Comp. Example 2 | Comp. Example 3 | Comp. Example 4 | Comp. Example 5 |
|---|---|---|---|---|---|---|---|---|
|  |  | Component (A-c-b-3) | parts by mass | — | — | — | — | — |
|  |  | Component (A-c-b-4) | parts by mass | — | — | — | — | 20 |
|  |  | Component (A-c-c-1) | parts by mass | — | — | — | — | — |
|  |  | Component (A-c-d-1) | parts by mass | — | — | — | — | — |
|  |  | Component (A-c-e-1) | parts by mass | — | — | — | — | 80 |
|  |  | Component (C-1) | parts by mass | — | — | — | — | — |
|  |  | Component (C-2) | parts by mass | — | — | — | — | — |
|  |  | Component (C-3) | parts by mass | — | — | — | — | — |
|  | Midstream supply inlet | Component (A-b-a-1) | parts by mass | — | — | — | — | — |
|  |  | Component (A-b-a-2) | parts by mass | — | — | 60 | — | — |
|  |  | Component (A-b-b-1) | parts by mass | — | — | — | — | — |
|  |  | Component (A-b-b-2) | parts by mass | — | — | — | — | — |
|  | Downstream supply inlet | Component (B-1) | parts by mass | — | — | — | — | — |
|  |  | Component (B-2) | parts by mass | — | 40 | 40 | — | — |
|  |  | Component (B-3) | parts by mass | — | — | — | 40 | — |
|  |  | Component (B-4) | parts by mass | — | — | — | — | — |
|  |  | Component (B-5) | parts by mass | — | — | — | — | — |
|  |  | Component (B-6) | parts by mass | — | — | — | — | — |
|  |  | Component (B-7) | parts by mass | — | — | — | — | — |
| Evaluation | (1-1) Dielectric constant at 1 GHz | | — | 3.0 | 4.4 | 4.2 | 2.6 | 2.3 |
|  | (1-2) Dielectric dissipation factor at 1 GHz | | — | 0.0030 | 0.0045 | 0.0135 | 0.0015 | 0.0002 |
|  | (1-3) Dielectric constant at 28 GHz | | — | 3.2 | 4.7 | 4.2 | 2.6 | 2.3 |
|  | (1-4) Dielectric dissipation factor at 28 GHz | | — | 0.0045 | 0.0065 | 0.0157 | 0.0015 | 0.0002 |
|  | (1-4) Dielectric dissipation factor at 10 GHz after water absorption | | — | 0.0033 | 0.0049 | 0.0270 | 0.0015 | 0.0002 |
|  | (2) DTUL | | °C. | 180 | 270 | 290 | 130 | 131 |
|  | (3-1) Platability | | — | X | X | O | X | O |
|  | (3-2) Adhesion strength of plating | | — | — | — | X | — | X |
|  | (4) Temperature dependence of dielectric dissipation factor at 28 GHz | | — | 0.00300 | 0.00324 | 0.00521 | 0.00450 | 0.00602 |
|  | (5-1) Average value of expansion coefficient | | $10^{-6} \times$ mm/mm/°C. | 61 | 50 | 64 | 160 | 68 |
|  | (5-2) Rate of change when rate of change in expansion coefficient is maximum | | % | −412 | −400 | 52 | −342 | 17 |
|  | (5-3) Maximum value of expansion coefficient | | $10^{-6} \times$ mm/mm/°C. | 101 | 90 | 132 | 182 | 81 |
|  | (6-1) Antenna efficiency at high temperature | | dB | −3.3 | −3.5 | −3.7 | −3.4 | −2.4 |
|  | (6-2) Antenna efficiency at low temperature | | dB | −2.4 | −2.6 | −3.5 | −2.2 | −1.5 |

INDUSTRIAL APPLICABILITY

The antenna member of the present disclosure can be suitably used in antenna filters, antenna elements (pendulums), and the like, and has industrial applicability. In particular, it is suitable for use as an antenna member that can be molded by injection molding and adaptable to any environment, including a low temperature, high temperature, or high humidity environment, with little dimensional change and little change in dielectric dissipation factor in high temperature regions while maintaining adhesion with a metal coating.

The invention claimed is:

1. An antenna member comprising an injection molded body made of a thermoplastic resin composition, and a metal coating on at least a portion of the injection molded body,
wherein the thermoplastic resin composition comprises
(A) a thermoplastic resin, the (A) thermoplastic resin comprising (A-a) a polyphenylene ether-based resin,
a deflection temperature under load (DTUL) of the thermoplastic resin composition is 120° C. or higher, and
when a temperature range while the thermoplastic resin composition is heated from −30° C. to 120° C. is divided into temperature ranges with intervals of 10° C., and a low temperature side and a high temperature side of respective two adjacent temperature ranges are defined as a low temperature range and a high temperature range, respectively, a low temperature range expansion coefficient of the resin composition in a TD direction (mm/mm/°C.) and a high temperature range expansion coefficient of the resin composition in the TD direction (mm/mm/°C.), as measured by the method described in ISO 11359, satisfy the following relationship in any of the two adjacent temperature ranges:

−50≤((high temperature range line expansion coefficient−low temperature range line expansion coefficient)/low temperature range line expansion coefficient)×100≤50.

2. The antenna member according to claim 1, wherein a temperature dependence of a dielectric dissipation factor of the thermoplastic resin composition at 28 GHz satisfies the following condition:
 1. when the DTUL is 120° C. or higher and lower than 140° C., a difference between a value of the dielectric dissipation factor at 23° C. and the value of the dielectric dissipation factor at 120° C. is 0.004 or less, or
 2. when the DTUL is 140° C. or higher, the difference between the value of the dielectric dissipation factor at 23° C. and the value of the dielectric dissipation factor at 140° C. is 0.004 or less.

3. The antenna member according to claim 1, wherein, when the temperature range while the thermoplastic resin composition is heated from −30° C. to 120° C. is divided into temperature ranges with intervals of 10° C., an average value of the line expansion coefficients in the temperature ranges of the resin composition in the TD direction, measured in accordance with ISO 11359 is $10 \times 10^{-5}$ mm/mm/° C. or less.

4. The antenna member according to claim 3, wherein, when the temperature range while the thermoplastic resin composition is heated from −30° C. to 120° C. is divided into temperature ranges with intervals of 10° C., a maximum value of the line expansion coefficients in the temperature ranges of the resin composition in the TD direction, measured in accordance with ISO 11359 is $10 \times 10^{-5}$ or less.

5. The antenna member according to claim 1, wherein the (A) thermoplastic resin comprises (A-b) a crystalline resin.

6. The antenna member according to claim 1, wherein the thermoplastic resin composition comprises 10 mass % or more of (B) an inorganic filler.

7. The antenna member according to claim 1, wherein the (A) thermoplastic resin comprises 10 mass % or more of (A-a) a polyphenylene ether-based resin.

8. The antenna member according to claim 1, used for an outdoor or indoor antenna base station.

9. The antenna member according to claim 1, wherein the metal coating is formed by chromic acid etching electroless copper plating.

10. The antenna member according to claim 1, wherein no crack is generated in the metal layer after the antenna member is allowed to stand at 85° C. and a humidity of 85% for 2000 h after the metal coating is formed by the chromic acid etching electroless copper plating.

11. The antenna member according to claim 1, wherein the thermoplastic resin composition further comprises (A-c-a) a polystyrene-based resin.

12. The antenna member according to claim 1, wherein the thermoplastic resin composition comprises (A-c-b) a block copolymer containing at least one block mainly composed of an aromatic vinyl monomer unit and at least one block mainly composed of a conjugated diene monomer unit, and/or a hydrogenated product of the block copolymer.

13. The antenna member according to claim 1, being an antenna filter.

14. The antenna member according to claim 1, being an antenna element.

* * * * *